United States Patent
Kim et al.

(10) Patent No.: US 11,832,141 B2
(45) Date of Patent: Nov. 28, 2023

(54) METHOD AND DEVICE FOR IMPROVING HANDOVER PERFORMANCE IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/289,215

(22) PCT Filed: Oct. 29, 2019

(86) PCT No.: PCT/KR2019/014355
§ 371 (c)(1),
(2) Date: Apr. 27, 2021

(87) PCT Pub. No.: WO2020/091373
PCT Pub. Date: May 7, 2020

(65) Prior Publication Data
US 2021/0345213 A1 Nov. 4, 2021

(30) Foreign Application Priority Data

Oct. 29, 2018 (KR) .................... 10-2018-0130248

(51) Int. Cl.
*H04W 36/30* (2009.01)
*H04W 36/00* (2009.01)
*H04W 74/08* (2009.01)

(52) U.S. Cl.
CPC ..... *H04W 36/305* (2018.08); *H04W 36/0058* (2018.08); *H04W 36/0061* (2013.01); *H04W 36/00837* (2018.08); *H04W 74/0841* (2013.01)

(58) Field of Classification Search
CPC ......... H04W 36/0016; H04W 36/0027; H04W 36/0033; H04W 36/0055; H04W 36/0058;
(Continued)

(56) References Cited

U.S. PATENT DOCUMENTS 8,880,078 B2 * 11/2014 Kim ................ H04W 24/08
370/332
2013/0021929 A1 * 1/2013 Kim ................ H04W 76/15
370/332
(Continued)

FOREIGN PATENT DOCUMENTS

JP 2011-259206 A 12/2011
KR 10-1491719 B1 2/2015
(Continued)

OTHER PUBLICATIONS

International Search Report dated Feb. 7, 2020 in connection with International Patent Application No. PCT/KR2019/014355, 2 pages.
(Continued)

*Primary Examiner* — Kan Yuen

(57) ABSTRACT

An operating method performed by a user equipment (UE) in a wireless communication system according to some embodiments of the present disclosure may include: generating a source link for transmitting and receiving data to and from a source base station; receiving, from the source base station, a radio resource control (RRC) message including configuration information for handover to a target base station; starting a timer, in response to the reception of the RRC message; transmitting, to the target base station, a message for handover to the target base station while the timer is running; and determining, in a case where the handover to the target base station fails up until the timer expires, whether to trigger RRC re-establishment, based on a state of the source link.

8 Claims, 18 Drawing Sheets

(58) Field of Classification Search
CPC ......... H04W 36/0061; H04W 36/0079; H04W 36/00837; H04W 36/08; H04W 36/18; H04W 36/305; H04W 8/24; H04W 74/0833; H04W 74/0841; H04W 76/18; H04W 76/19; H04W 76/30; H04W 88/023; H04W 36/0011; H04W 36/185
See application file for complete search history.

(56) References Cited

U.S. PATENT DOCUMENTS

| | | | |
|---|---|---|---|
| 2013/0084871 A1 | 4/2013 | Kitaji et al. | |
| 2015/0055620 A1* | 2/2015 | Vesterinen | H04W 36/18 370/331 |
| 2015/0373772 A1 | 12/2015 | Watanabe et al. | |
| 2017/0048898 A1 | 2/2017 | Jung et al. | |
| 2017/0150408 A1* | 5/2017 | Joseph | H04W 76/28 |
| 2018/0020382 A1* | 1/2018 | Kim | H04L 1/189 |
| 2018/0124687 A1* | 5/2018 | Park | H04L 5/1469 |
| 2018/0288661 A1 | 10/2018 | Liang et al. | |
| 2019/0182732 A1* | 6/2019 | Wei | H04W 24/10 |
| 2019/0223057 A1* | 7/2019 | Park | H04W 36/0016 |
| 2019/0253945 A1* | 8/2019 | Paladugu | H04W 12/033 |
| 2020/0022039 A1* | 1/2020 | Kadiri | H04W 36/0079 |
| 2020/0029260 A1* | 1/2020 | Kadiri | H04W 36/08 |
| 2020/0154326 A1* | 5/2020 | Deenoo | H04W 36/08 |
| 2020/0374773 A1* | 11/2020 | Zhang | H04W 36/32 |

FOREIGN PATENT DOCUMENTS

| | | |
|---|---|---|
| KR | 10-2016-0135759 A | 11/2016 |
| KR | 10-2017-0114258 A | 10/2017 |

OTHER PUBLICATIONS

ZTE Corporation, "Introduction of mobility enhancement solutions in RRC", 3GPP TSG-RAN2 Meeting #96, Nov. 14-18, 2016, R2-168954, 24 pages.

Nokia et al., "Corrections to makeBeforeBreak handover", 3GPP TSG-RAN WG2 Meeting #96, Nov. 14-18, 2016, R2-168425, 12 pages.

ZTE Corporation, "RLF analysis on make before break solution", 3GPP TSG RAN WG2 Meeting #95bis, Oct. 10-14, 2016, R2-166608, 3 pages.

Vice-Chairman (CMCC), "Report from LTE Break-Out session (eVoLTE, Light conn, Mobility enh, eMBMS, Context aware)", 3GPP TSG RAN WG2 #95bis, Oct. 10-14, 2016, R2-167241, 15 pages.

Supplementary European Search Report dated Oct. 8, 2021 in connection with European Patent Application No. EP 19 87 9104, 11 pages.

Office Action dated Aug. 8, 2023, in connection with Korean Patent Application No. 10-20180130248, 11 pages.

Communication pursuant to Article 94(3) EPC dated Oct. 6, 2023, in connection with European Patent Application No. 19879104.8, 8 pages.

ZTE Corporation (Rapporteur), "Report of the email discussion on the 0ms handover interruption time requirement from IMT2020," 3GPP TSG-RAN WG2#101 R2-1802401, Athens, Greece, Feb. 26-Mar. 2, 2018, 19 pages.

Qualcomm Incorporated, "LTE Mobility Enhancements," 3GPP TSG-RAN WG2 Meeting #103bis R2-1814206, Chengdu, China, Oct. 8-12, 2018, 9 pages.

ZTE Corporation, "Introduction of mobility enhancement solutions in RRC," 3GPP TSG-RAN2 Meeting #97 R2-1702394, Athens, Greece, Feb. 13-17, 2017, 52 pages.

* cited by examiner

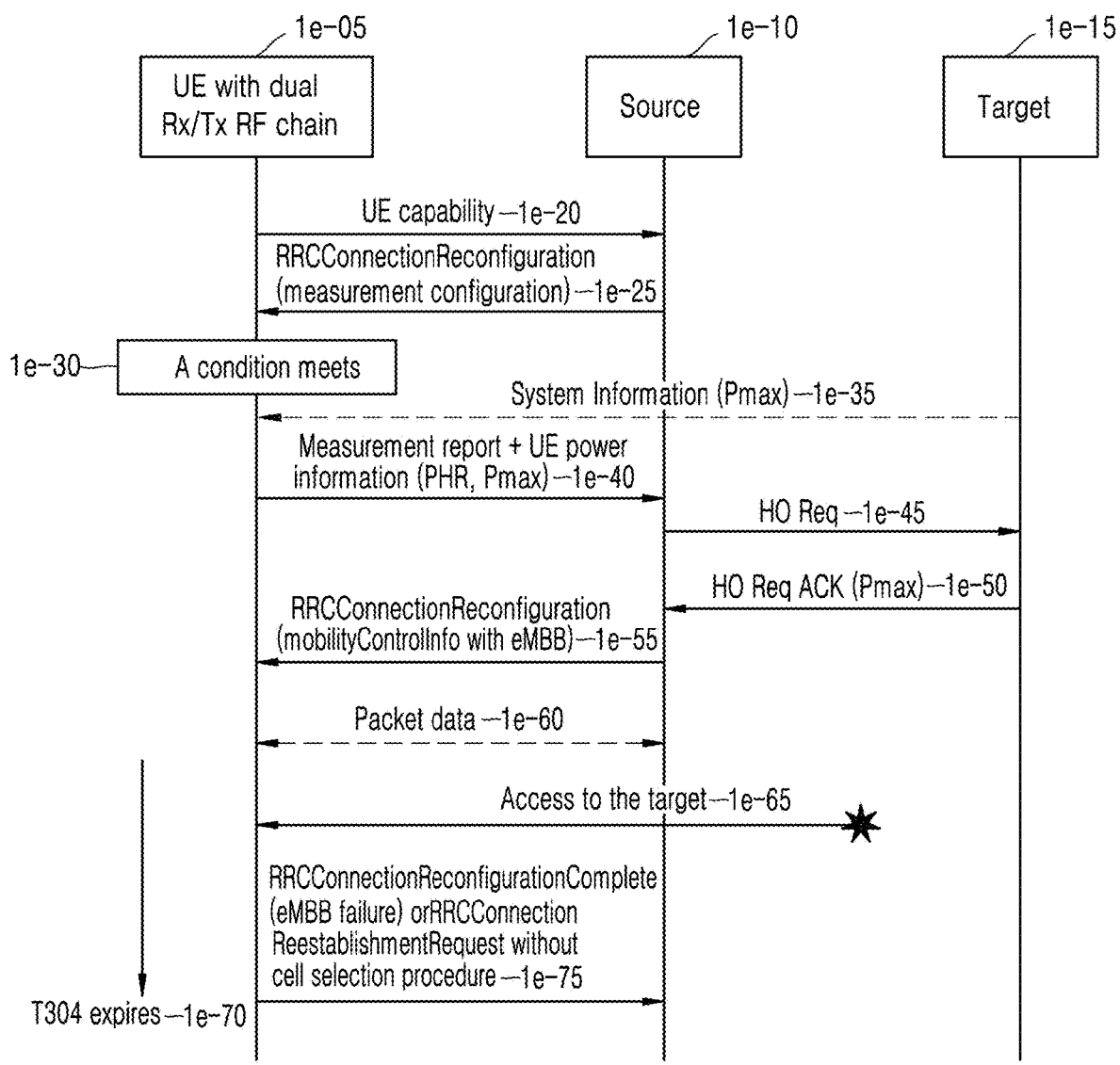

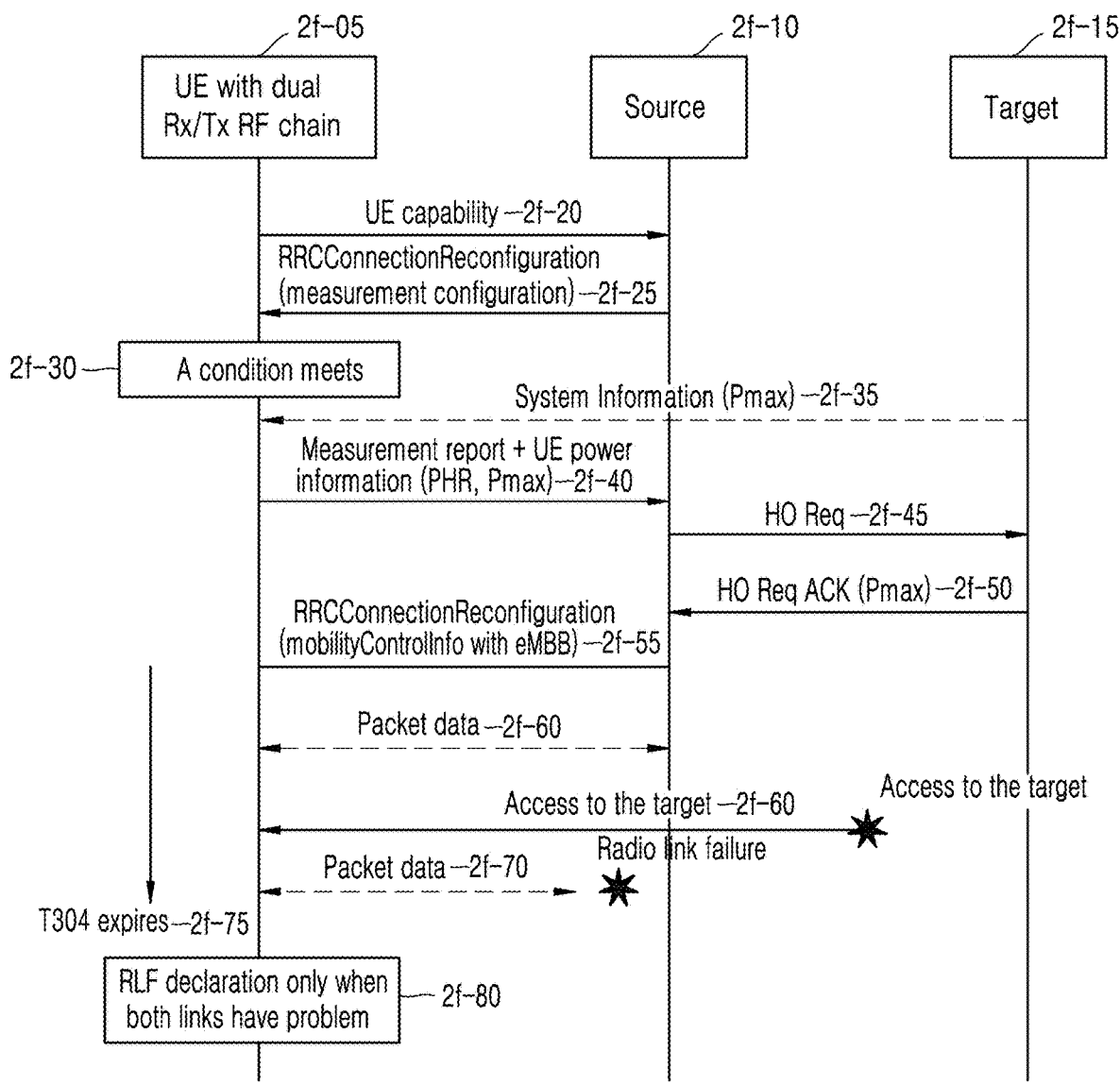

METHOD AND DEVICE FOR IMPROVING HANDOVER PERFORMANCE IN MOBILE COMMUNICATION SYSTEM

CROSS-REFERENCE TO RELATED APPLICATIONS

This application is a 371 of International Application No. PCT/KR2019/014355 filed on Oct. 29, 2019, which claims priority to Korean Patent Application No. 10-2018-0130248 filed on Oct. 29, 2018, the disclosures of which are herein incorporated by reference in their entireties.

BACKGROUND

1. Field

The present disclosure relates to a method and device for transmitting and receiving data in a mobile communication system.

2. Description of Related Art

To meet the increase in demand with respect to wireless data traffic after the commercialization of 4th Generation (4G) communication systems, considerable efforts have been made to develop improved 5th Generation (5G) communication systems or pre-5G communication systems. For this reason, 5G communication systems or pre-5G communication systems are called beyond 4G network communication systems or post Long Term Evolution (LTE) systems. To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in an ultra-high frequency band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, technologies, such as evolved small cell, advanced small cell, cloud radio access network (cloud RAN), ultra-dense network, Device-to-Device (D2D) communication, wireless backhaul, moving network, cooperative communication, Coordinated Multi-Points (CoMP), and reception interference cancellation, are being developed. In addition, for 5G communication systems, hybrid Frequency Shift Keying (FSK) and Quadrature Amplitude Modulation (QAM) (FQAM) and Sliding Window Superposition Coding (SWSC), which are Advanced Coding Modulation (ACM) schemes, and Filter Bank Multi-Carrier (FBMC), Non-Orthogonal Multiple Access (NOMA), and Sparse Code Multiple Access (SCMA), which are advanced access technologies, have been developed.

The Internet has evolved from a human-centered connection network, through which humans generate and consume information, to an Internet of Things (IoT) network that exchanges and processes information between distributed elements such as objects. An internet of everything (IoE) technology in which a big data processing technology via a connection with a cloud server or the like is combined with the IoT technology has emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. The IoT may be applied to fields, such as smart homes, smart buildings, smart cities, smart cars or connected cars, a smart grid, health care, a smart home appliance, or high-tech medical services, via the convergence and combination of existing information technologies and various industries.

Accordingly, various attempts are being made to apply 5G communication systems to IoT networks. For example, technologies, such as a sensor network, machine-to-machine (M2M) communication, and machine-type communication (MTC) are implemented by beamforming, MIMO, or array antenna schemes. The application of cloud RAN as the big data processing technology described above may be an example of convergence of 5G communication technology and IoT technology.

As it is now possible to provide various services according to the development of mobile communication systems, there is a need for a method of efficiently providing the services.

SUMMARY

Disclosed embodiments provide a method and device for improving handover performance in a mobile communication system.

Disclosed embodiments provide a method and device for improving handover performance in a mobile communication system.

BRIEF DESCRIPTION OF THE DRAWINGS

FIG. 1E is a flowchart illustrating a process of performing fallback to a source cell when handover fails, according to some embodiments.

FIG. 2F is a flowchart illustrating a process of declaring an RLF during an enhance Make Before Break (eMBB) operation, according to some embodiments.

DETAILED DESCRIPTION

Figure 1A:
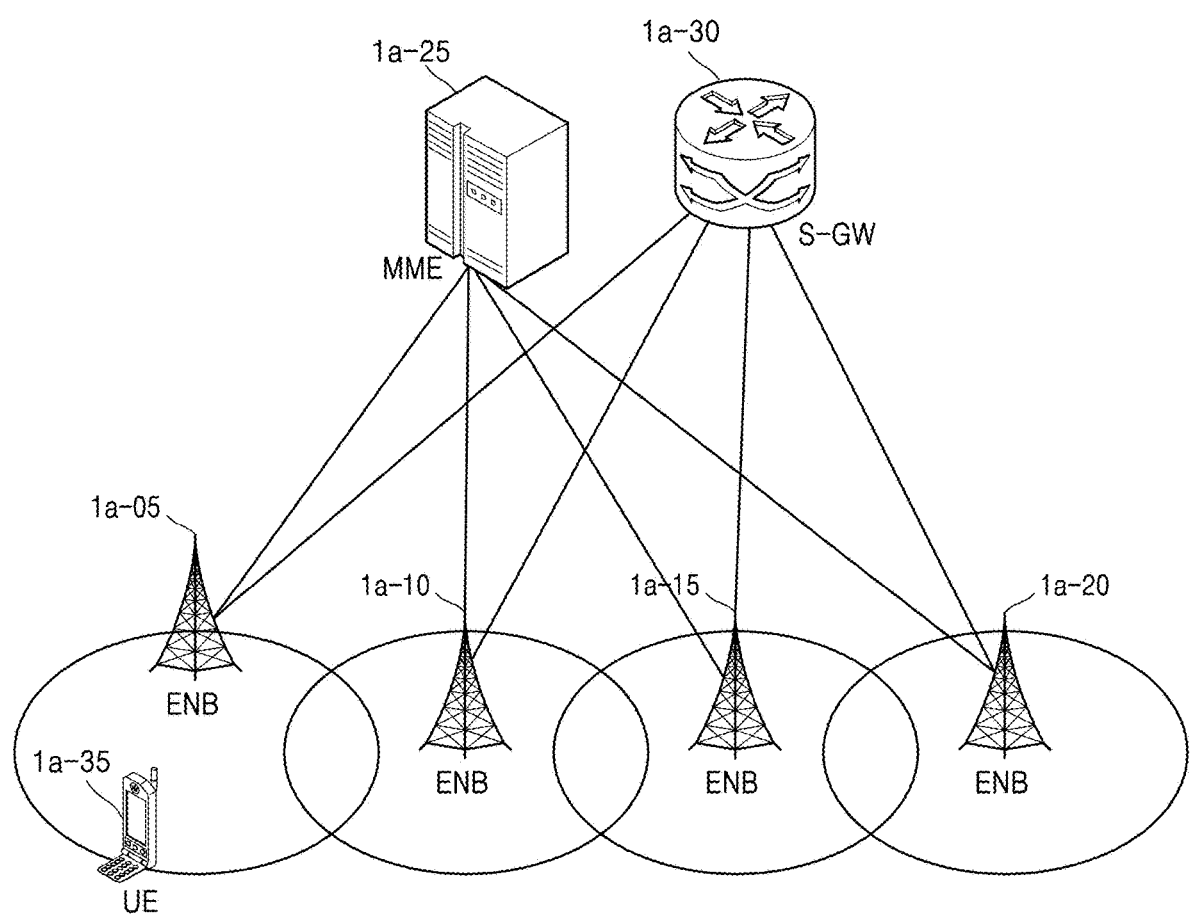
FIG. 1A is a diagram illustrating an architecture of an LTE system, according to some embodiments.

According to some embodiments of the present disclosure, an operating method performed by a user equipment (UE) in a wireless communication system may include: reporting, to a source base station, whether an enhanced Make Before Break (eMBB) operation is supported; receiving, from the source base station, mobilityControlInfo including an indicator that indicates to perform handover based on the eMBB operation; performing random access to a target base station, based on the mobilityControlInfo; transmitting, to the target base station, an RRCConnectionReconfigurationComplete message; and stopping, in response to the transmission of the RRCConnectionReconfigurationComplete message, data transmission and reception with the source base station.

According to some embodiments of the present disclosure, an operating method performed by a base station in a wireless communication system may include: receiving, from a UE, a report indicating whether an enhanced Make Before Break (eMBB) operation is supported; transmitting, to the UE, mobilityControlInfo including an indicator that indicates to perform handover based on the eMBB; receiving an RRCConnectionReconfigurationComplete message from the UE; and stopping, in response to the reception of the RRCConnectionReconfigurationComplete message, data transmission and reception with the UE.

According to other embodiments of the present disclosure, the operating method performed by a UE in a wireless communication system may include: reporting, to a source base station, whether an enhanced Make Before Break (eMBB) operation is supported; receiving, from the source base station, mobilityControlInfo including an indicator that indicates to perform handover based on the eMBB; performing random access to a target base station based on the mobilityControlInfo; determining whether handover to the target base station via the random access is successful; and declaring, in a case of a handover failure, a radio link failure (RLF) based on determining whether each of the source base station and the target base station satisfies an RLF declaration condition, and the RLF declaration condition may be determined based on a signal quality of a downlink from each of the source base station and the target base station.

The operating method performed by a UE in a wireless communication system may include: generating a source link for transmitting and receiving data to and from a source base station; receiving, from the source base station, a radio resource control (RRC) message including configuration information for handover to a target base station; starting a timer, in response to the reception of the RRC message; transmitting, to the target base station, a message for handover to the target base station while the timer is running; and determining, in a case where the handover to the target base station fails until the timer expires, whether to trigger RRC re-establishment, based on a state of the source link.

A UE in a wireless communication system may include: a transceiver; and at least one processor configured to generate a source link for transmitting and receiving data to and from a source base station, receive, from the source base station, an RRC message including configuration information for handover to a target base station, start a timer, in response to the reception of the RRC message, transmit, to the target base station, a message for handover to the target base station while the timer is running, and determine, in a case where the handover to the target base station fails until the timer expires, whether to trigger RRC re-establishment, based on a state of the source link.

An embodiment of the present disclosure may include a computer-readable recording medium having stored therein a program for performing: generating a source link for transmitting and receiving data to and from a source base station; receiving, from the source base station, an RRC message including configuration information for handover to a target base station; starting a timer in response to the reception of the RRC message; transmitting, to the target base station, a message for handover to the target base station while the timer is running; and determining, in a case where the handover to the target base station fails until the timer expires, whether to trigger RRC re-establishment, based on a state of the source link.

Hereinafter, embodiments of the present disclosure will be described in detail with reference to the accompanying drawings. In describing the present disclosure, when the detailed description of the relevant known functions or configurations is determined to unnecessarily obscure the gist of the present disclosure, the detailed description thereof may be omitted. The terms as used herein are those defined by taking into account functions in the present disclosure, but the terms may vary depending on the intention of users or operators, precedents, or the like. Therefore, the definitions should be made based on the contents throughout the specification.

The advantages and features of the present disclosure and ways to achieve them will be apparent by making reference to embodiments as described below in detail in conjunction with the accompanying drawings. However, the present disclosure is not limited to the embodiments described below, but may be implemented in various different forms, the embodiments are solely provided to make the present disclosure complete and to inform a person of skill in the art to which the present disclosure pertains of the full scope of the disclosure, and the present disclosure is only defined by the scope of the claims. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the present disclosure, the "module" or "-er/or" may include one or more processors.

In describing the present disclosure, when the detailed description of the relevant known functions or configurations is determined to unnecessarily obscure the gist of the present disclosure, the detailed description thereof may be omitted. Hereinafter, embodiments of the present disclosure will be described with reference to the accompanying drawings.

The term for identifying an access node, the term referring to network entities, the term referring to messages, the term referring to an interface between network entities, the terms referring to a variety of identification information, and the like are exemplified for convenience of description. Therefore, the present disclosure is not limited to the terms to be described later, and other terms referring to entities having an equivalent technical meaning may be used.

For convenience of description, the terms and names defined in the 3rd Generation Partnership Project Long Term Evolution (3GPP LTE) standard are used herein. However, the present disclosure is not limited by the terms and names and may be equally applied to systems conforming to other standards. The term "eNB" as used in the present disclosure may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

Hereinafter, a base station assigns resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smart phone, a computer, or a multimedia system capable of performing a communication function. Of course, the present disclosure is not limited to the above examples.

In particular, the present disclosure may be applied to 3GPP New Radio (NR) ($5^{th}$ Generation (5G) mobile communication standard). Also, the present disclosure may be applied to intelligent services (e.g., smart homes, smart buildings, smart cities, smart cars or connected cars, health care, digital education, retail, security and safety related services, etc.) based on 5G communication technologies and IoT related technologies. The term "eNB" as used herein may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

FIG. 1A is a diagram illustrating an architecture of an LTE system, according to some embodiments.

Referring to FIG. 1A, a radio access network of the LTE system may include Evolved Node Bs (hereinafter, referred to as ENBs, Node Bs, or base stations) 1a-05, 1a-10, 1a-15, and 1a-20, a mobility management entity (MME) 1a-25, and a serving-gateway (S-GW) 1a-30. A user equipment (hereinafter, referred to as a UE or a terminal) 1a-35 may access an external network through the ENBs 1a-05 to 1a-20 and the S-GW 1a-30.

In FIG. 1A, the ENBs 1a-05 to 1a-20 may correspond to an existing Node B of a universal mobile telecommunications system (UMTS). The ENB may be connected to the UE 1a-35 through a wireless channel and may serve more complicated roles than the existing Node B. In the LTE system, because all user traffics including real-time services such as Voice over IP (VoIP) through an Internet protocol are provided through a shared channel, a device for collecting and scheduling status information such as buffer status, available transmission power status, and channel status of UEs may be required, and this may be handled by the ENBs 1a-05 to 1a-20. One ENB may typically control a plurality of cells. For example, in order to implement a transmission rate of 100 Mbps, the LTE system may use, for example, an orthogonal frequency division multiplexing (hereinafter, referred to as OFDM) scheme in a 20-MHz bandwidth as a radio access technology. Also, a modulation scheme and an adaptive modulation and coding (hereinafter, referred to as AMC) scheme that determines a channel coding rate may be applied according to the channel status of the UE. The S-GW 1a-30 is a device that provides data bearers, and may generate or remove data bearers under the control by the MME 1a-25. The MME is a device that is responsible for various control functions as well as mobility management functions for the UE, and may be connected to a plurality of base stations.

Figure 1B:
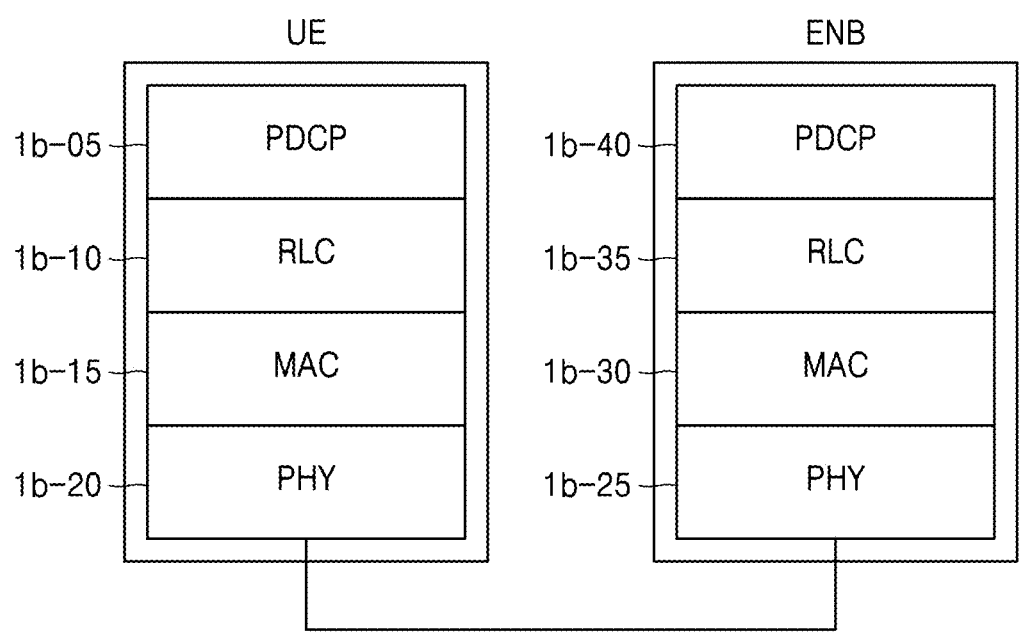
FIG. 1B is a diagram illustrating a radio protocol architecture of the LTE system, according to some embodiments.

FIG. 1B is a diagram illustrating a radio protocol architecture of the LTE system, according to some embodiments.

Referring to FIG. 1B, in a radio protocol of the LTE system, a UE and an ENB may respectively include packet data convergence protocols (PDCPs) 1b-05 and 1b-40, radio link controls (RLCs) 1b-10 and 1b-35, and medium access controls (MACs) 1b-15 and 1b-30. The PDCPs 1b-05 and 1b-40 may be responsible for operations such as IP header compression/decompression, and the RLCs 1b-10 and 1b-35 may perform an automatic repeat request (ARQ) operation by reconfiguring a packet data convergence protocol (PDCP) packet data unit (PDU) to an appropriate size. The MACs 1b-15 and 1b-30 may be connected to RLC layer entities configured in one UE, and may perform an operation of multiplexing RLC PDUs to MAC PDUs and demultiplexing RLC PDUs from MAC PDUs. Physical layers 1b-20 and 1b-25 perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the decoded OFDM symbols to an upper layer.

Figure 1C:
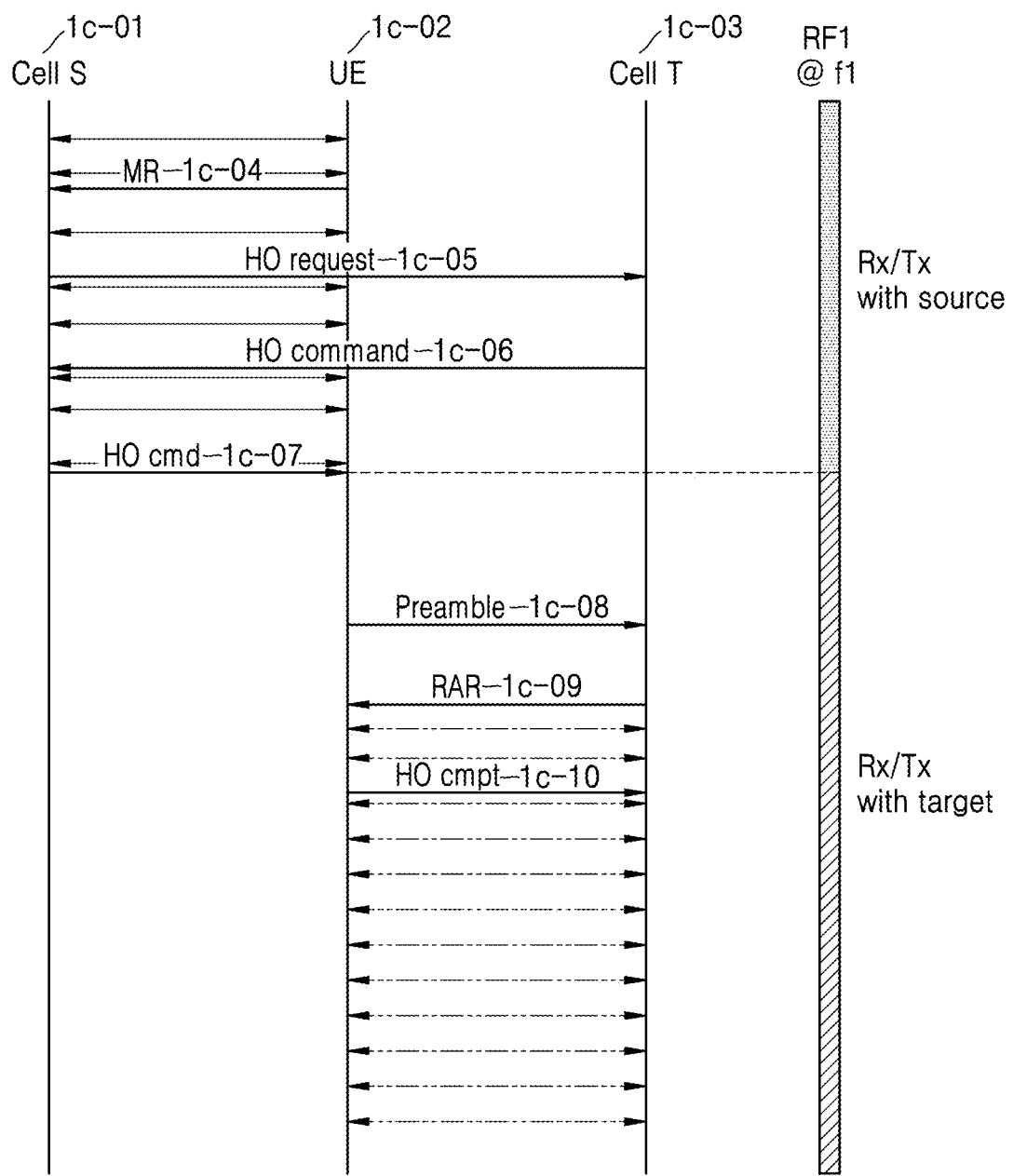
FIG. 1C is a diagram illustrating a handover procedure in the LTE system, according to some embodiments.

FIG. 1C is a diagram illustrating a handover procedure in the LTE system, according to some embodiments.

A UE 1c-02 that is in a connection mode may transmit a cell measurement report to a current serving cell 1c-01 periodically or when a predefined event is satisfied (1c-04). The serving cell (or source cell) 1c-01 may determine whether the UE 1c-02 is to perform handover to a neighboring cell, based on the cell measurement report. Handover is a technique of changing a primary cell that provides a service to a UE that is in a connection mode, to one of neighboring cells. The serving cell 1c-01 may request, for handover, a new cell, i.e., a target cell 1c-03 that is to provide the service to the UE 1c-02 (1c-05). In a case where the target cell 1c-03 accepts the request, the target cell 1c-03 may transmit a HO command message to the current serving cell 1c-01 (1c-06). The serving cell 1c-01 may transmit the received HO command to the UE 1c-02 by using an RRC Connection Reconfiguration message (1c-07). At the same time, data transmission and reception between the serving cell 1c-01 and the UE 1c-02 may be stopped. The UE 1c-02 may attempt random access to the target cell 1c-03 indicated by the serving cell 1c-01 (1c-08). The random access may be an operation of notifying the target cell 1c-03 that the UE 1c-02 is to be transferred to the target cell 1c-03, and, performing uplink synchronization at the same time. In order to perform the random access, the UE 1c-02 may transmit, to the target cell 1c-03, a preamble ID provided from the serving cell 1c-01 or a preamble corresponding to a randomly selected preamble. After a certain number of subframes since the transmission of the preamble by the UE 1c-02, the UE 1c-02 may monitor whether a random access response (RAR) is transmitted from the target cell 1c-03. A time interval during which the UE 1c-02 monitors whether the random access response is transmitted from the target cell 1c-03 may be referred to as a random access response window (RAR window). During the RAR window, when the RAR is transmitted (1c-09), the UE 1c-02 may respond to the target cell 1c-03 with an RRC Connection Reconfiguration Complete message (1c-10). Accordingly, from the beginning of the RAR window, the UE 1c-02 may attempt to receive data from the target cell, and, after the RAR is received, may start transmission to the target cell 1c-03 by transmitting the RRC Connection Reconfiguration Complete message to the target cell 1c-03.

Figure 1D:
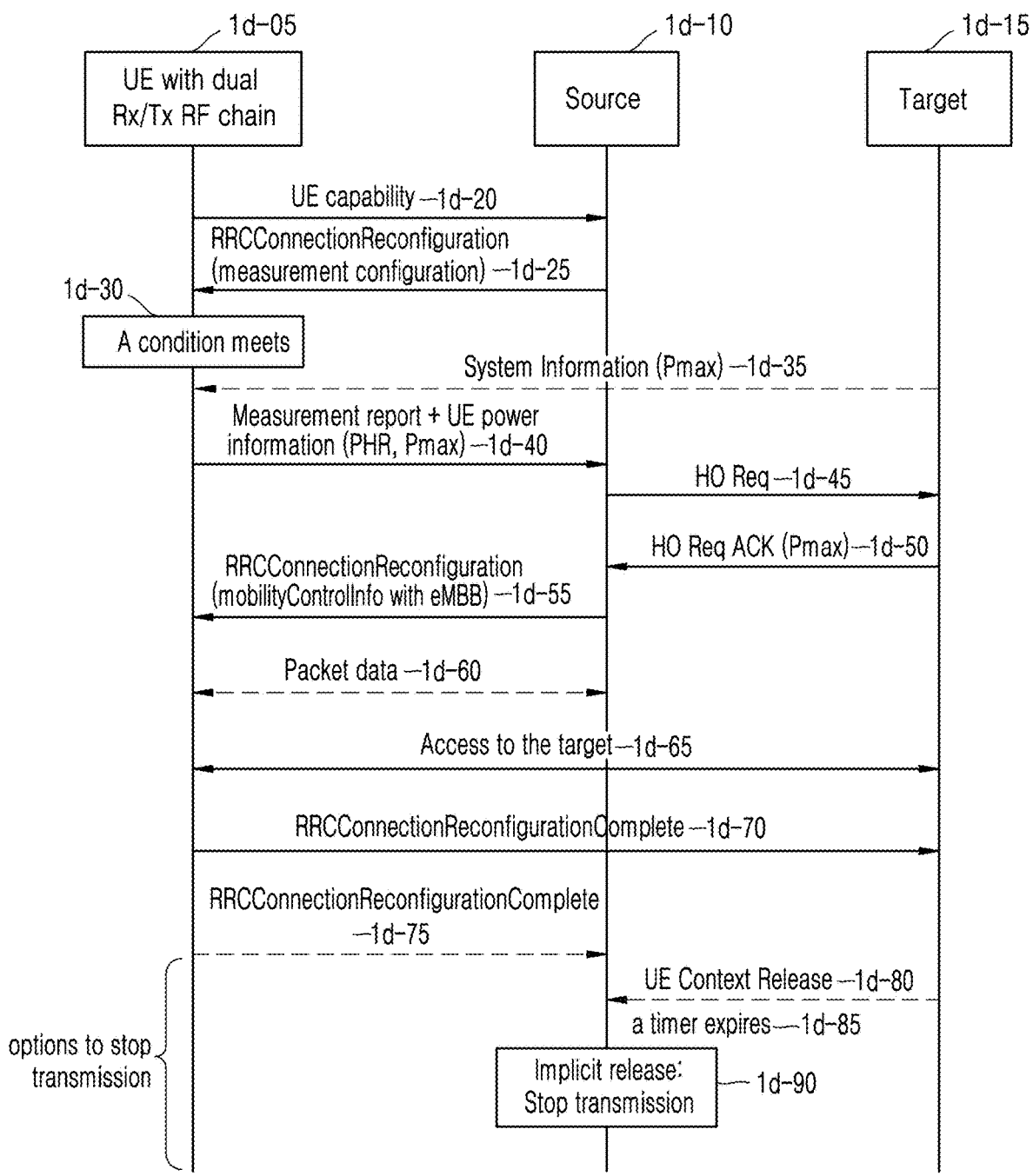
FIG. 1D is a flowchart illustrating a handover procedure that minimizes an interruption time, according to some embodiments.

In the above-described conventional handover procedure, a specific UE is unable to transmit its own data or receive data for a time interval between a time point at which the UE receives the HO command from the current serving cell, and a time point at which the handover is completed and the UE transmits the RRC Connection Reconfiguration Complete message. Such a state in which data transmission and reception are interrupted causes a certain time delay that is called an interruption time. In order to reduce the interruption time, an improvement in that the UE maintains data transmission and reception with the source cell until a time point at which the UE transmits a first preamble to the target cell, rather than the time point at which the UE receives the HO command. This scheme is referred to as a Make Before Break (MBB) technique. This was developed in consideration of a UE with a single RX/TX chain. Although the MBB may reduce the interruption time compared to the conventional handover procedure, there is still the remaining interruption time between the time point at which the UE transmits the preamble and the time point at which the UE transmits the RRC Connection Reconfiguration Complete message to the target cell. The present disclosure proposes a method of minimizing such a delay time by using a UE with a dual RX/TX RF chain. In the present disclosure, this is referred to as enhanced MBB (eMBB). In the eMBB, a UE uses its dual RX/TX chain capability to perform handover while maintaining data transmission and reception with both source and target base stations FIG. 1D is a flowchart illustrating a handover procedure that minimizes an interruption time, according to some embodiments.

A UE 1d-05 with a dual RX/TX chain may report, to a source base station 1d-10, that the UE 1d-05 supports a dual RX/TX chain. Alternatively, the UE 1d-05 may report, to the source base station 1d-10, that the UE 1d-05 supports an eMBB operation (1d-20). The dual RX/TX chain may mean an RF module capable of receiving data simultaneously from two different downlink radio links and transmitting data simultaneously to the two different downlink radio links. The source base station 1d-10 may configure a measurement configuration for mobility support for the UE 1d-05, by using an RRCConnectionReconfiguration message (1d-25). In a case where a condition for triggering handover is satisfied and the UE 1d-05 is required to transmit a measurement report to the source base station 1d-10 periodically or based on an event (1d-40), the UE may include, in the measurement report, information related to transmission power of the UE and UE transmission power information required by neighboring cells. For example, the information related to transmission power of the UE may include power headroom (PH) information of the UE. A PH value may mean the remaining power that the UE may additionally consume to transmit data. In addition, the information related to transmission power of the UE may include a current (average) power consumption of the UE, the maximum transmission power of the UE, and the like. The UE transmission power information required by the neighboring cells (those expected to be a target cell) may be a Pmax value. The Pmax value may be minimum UE transmission power required for a signal transmitted from a UE to be obtained by a base station in an uplink. The UE 1d-05 may obtain the Pmax value from system information of a target cell 1d-15 (hereinafter, also referred to as the target base station 1d-15) (1d-35), and report the obtained Pmax value to a source cell. However, the Pmax value may not be frequently changed, and the source cell may obtain and store the Pmax value from a neighboring target cell in advance according to the implementation or a standard procedure, and thus, the UE 1d-05 may not necessarily report the Pmax value to the source cell. For example, when the source cell requests the target cell for handover, the target cell may include the Pmax value in an acknowledgement message for the request. The above-described power information may not be included in the measurement report, and may be included in a separate RRC message or a MAC control element (CE) (e.g., a power headroom report (PHR)) to be reported to the source base station 1d-10. However, the above-described power information may have to be reported to the source base station 1d-10 at a time point that is substantially identical to a time point at which the measurement report is transmitted. The above-described power information may be used for the source base station 1d-10 to determine an eMBB configuration. In a case where the UE 1d-05 has a dual RX/TX chain but does not have a sufficient transmission power amount to perform data transmission and reception simultaneously with the two base stations 1d-10 and 1d-15, eMBB cannot be configured. As a solution to this problem, a time period during which the UE 1d-05 is able to perform data transmission and reception with the two base stations 1d-10 and 1d-15 may be divided, and the UE 1d-05 may be restricted to transmit data to only one base station at one time interval. To this end, a time-division multiplexing (TDM) pattern that indicates the time division has to be provided to the UE 1d-05 in advance, and an exceptional situation, in which the TDM pattern is ignored in a specific case and the UE has to transmit data to one base station by priority, may have to be defined. The exceptional situation may mean a situation in which transmission (e.g., preamble or msg3 transmission to the target cell) is required to be performed for establishing a connection with a specific base station, and the UE 1d-05 may ignore the TDM pattern and perform transmission to the target cell 1d-15. The source base station 1d-10 having received the measurement report may determine whether to perform handover with a specific neighboring base station, based on cell measurement information included in the measurement report. In addition, the source base station 1d-10 may transmit a handover request message to the target base station 1d-15, and the target base station 1d-15 may transmit, to the source base station 1d-10, an acknowledgement message for the handover request message (1d-50). The handover request message transmitted from the source base station 1d-10 to the target base station 1d-15 may include an indicator that indicates that the UE 1d-05 is to perform eMBB. The acknowledgement message transmitted from the target base station 1d-15 to the source base station 1d-10 may include configuration information necessary for the UE 1d-05 to access the target cell 1d-15. The source base station 1d-10 may transmit, to the UE 1d-05, handover configuration information, mobilityControlInfo, and the like, by using RRCConnectionReconfiguration (1d-55). The mobilityControlInfo may include an indicator that indicates handover using eMBB. The UE 1d-05 having received the indicator that indicates handover using eMBB may maintain data transmission and reception with the source cell even after transmitting the first preamble to the target cell (1d-60). In a case where the UE 1d-05 has successfully transmitted, to the target cell, an RRCConnectionReconfigurationComplete message in msg3 (1d-70) in a random access procedure 1d-65 to the target cell, the UE 1d-05 may consider that the handover has been successfully performed.

In the present embodiment, in the eMBB operation, a time point at which the UE 1d-05 is to stop data transmission and reception with the source base station 1d-10, is defined to be a time point at which the UE 1d-05 transmits the RRCConnectionReconfigurationComplete message to the target base station 1d-15 involved in the handover. The source base station 1d-10 also has to stop data transmission and reception operations with the UE 1d-05 at a specific time point. The present embodiment proposes the following options.

Option 1) The UE 1d-05 may transmit RRCConnectionReconfigurationComplete to the source base station as well as the target base station 1d-15. The source base station 1d-10 stops data transmission and reception with the UE 1d-05 at a time point of receiving the RRC message (1d-75).

Option 2) The target base station 1d-15 stops data transmission and reception with the UE 1d-05 at a time point at which the target base station 1d-15 transmits a UE Context Release message to the source base station 1d-10 (1d-80).

Option 3) The source base station 1d-10 starts a specific timer at a time point of transmitting the mobilityControlInfo to the UE 1d-05, and stops data transmission and reception with the UE 1d-05 when the timer expires (1d-85).

Option 4) The source base station 1d-10 stops data transmission and reception with the UE 1d-05 at an arbitrary time point according to the implementation (1d-90). For example, a channel quality state between the UE 1d-05 and the source base station 1d-10 may deteriorate. Accordingly, in a case where ACK/NACK for transmitted data is not received from the UE or where any data is not received from the UE, after a certain amount of time has elapsed, the source base station 1d-10 may stop data transmission and reception with the UE 1d-05.

FIG. 1E is a flowchart illustrating a process of performing fallback to a source cell when handover fails, according to some embodiments.

A UE 1e-05 with a dual RX/TX chain may report, to a source base station 1e-10, that the UE 1e-05 supports a dual RX/TX chain. Alternatively, the UE 1e-05 may report, to the source base station 1e-10, that the UE 1e-05 supports an eMBB operation (1e-20). The dual RX/TX chain may refer to an RF module capable of receiving data simultaneously from two different downlink radio links and transmitting data simultaneously to the two different downlink radio links. The source base station 1e-10 may configure a measurement configuration for mobility support for the UE 1e-05, by using an RRCConnectionReconfiguration message (1e-25). In a case where a condition for triggering handover is satisfied and the UE 1e-05 is required to transmit a measurement report to the source base station 1e-10 periodically or based on an event (1e-40), the UE may include, in the measurement report, information related to transmission power of the UE and UE transmission power information required by neighboring cells. For example, the information related to transmission power of the UE may include power headroom (PH) information of the UE. A PH value may mean the remaining power that the UE may additionally consume to transmit data. In addition, the information related to transmission power of the UE may include a current (average) power consumption of the UE, the maximum transmission power of the UE, and the like. The UE transmission power information required by the neighboring cells (those expected to be a target cell) may be a Pmax value. The Pmax value may be minimum UE transmission power required for a signal transmitted from a UE to be obtained by a base station in an uplink. The UE 1e-05 may obtain the Pmax value from system information of a target cell (1d-35), and report the obtained Pmax value to a source cell. However, the Pmax value may not be frequently changed, and the source cell may obtain and store the Pmax value from a neighboring target cell in advance according to the implementation or a standard procedure, and thus, the UE 1e-05 may not necessarily report the Pmax value to the source cell. For example, when the source cell requests the target cell for handover, the target cell may include the Pmax value in an acknowledgement message for the request. The above-described power information may not be included in the measurement report, and may be included in a separate RRC message or a MAC CE (e.g., a power headroom report (PHR)) to be reported to the source base station 1e-10. However, the above-described power information may have to be reported to the source base station 1e-10 at a time point that is substantially identical to a time point at which the measurement report is transmitted. The above-described power information may be used for the source base station 1e-10 to determine an eMBB configuration. In a case where the UE 1e-05 has a dual RX/TX chain but does not have a sufficient transmission power amount to perform data transmission and reception simultaneously with two base stations 1e-10 and 1e-15, eMBB cannot be configured. As a solution to this problem, a time period during which the UE 1e-05 is able to perform data transmission and reception with the two base stations 1e-10 and 1e-15 may be divided, and the UE 1e-05 may be restricted to transmit data to only one base station at one time interval. To this end, a TDM pattern that indicates the time division has to be provided to the UE 1e-05 in advance, and an exceptional situation, in which the TDM pattern is ignored in a specific case and the UE has to transmit data to one base station by priority, may have to be defined. The exceptional situation may mean a situation in which transmission (e.g., preamble or msg3 transmission to the target cell) is required to be performed for establishing a connection with a specific base station, and the UE 1e-05 may ignore the TDM pattern and perform transmission to the target cell. The source base station 1e-10 having received the measurement report may determine whether to perform handover with a specific neighboring base station, based on cell measurement information included in the measurement report. In addition, the source base station 1e-10 may transmit a handover request message to a target base station 1e-15, and the target base station 1e-15 may transmit, to the source base station 1e-10, an acknowledgement message for the handover request message (1e-50). The handover request message transmitted from the source base station 1e-10 to the target base station 1e-15 may include an indicator that indicates that the UE 1e-05 is to perform eMBB. The acknowledgement message transmitted from the target base station 1e-15 to the source base station 1e-10 may include configuration information necessary for the UE 1e-05 to access the target cell. The source base station 1e-10 may transmit, to the UE 1e-05, handover configuration information, mobilityControlInfo, and the like, by using RRCConnectionReconfiguration (1e-55). The UE 1e-05 having received an RRC message including the mobilityControlInfo may start a timer T304. The mobilityControlInfo may include an indicator that indicates handover using eMBB. The UE 1e-05 having received the indicator that indicates handover using eMBB may maintain data transmission and reception with the source cell even after transmitting a first preamble to the target cell (1e-60). In a case where the UE 1e-05 has successfully transmitted, to the target cell, an RRCConnectionReconfigurationComplete message in msg3 in a random access procedure 1e-65 with respect to the target cell, the UE 1e-05 may consider that the handover has been successfully performed. On the other hand, in a case where the UE 1e-05 has not successfully transmitted the RRC message to the target base station 1e-15 until the timer T304 expires (1e-70), the UE 1e-05 may consider that the handover has failed.

In a case where data transmission and reception between the source base station 1e-10 and the UE 1e-05 are being performed with a good channel state, the UE 1e-05 does not declare a radio link failure (RLF) despite the handover failure. Alternatively, the UE 1e-05 may transmit, to the source base station 1e-10, an RRCConnectionReconfigurationComplete message including an indicator that indicates that the handover based on the configured eMBB has failed. Yet alternatively, the UE 1e-05 may transmit an RRCConnectionReestablishmentRequest message to the source base station 1e-10 without a cell selection operation. Here, the RRCConnectionReestablishmentRequest message transmitted from the UE 1e-05 to the source base station 1e-10 may include a cause value that indicates eMBB failure. In a case where the RRCConnectionReestablishmentRequest message is transmitted to the source base station 1e-10, the source base station 1e-10 may transmit an RRCConnectionReestablishment message to the UE 1e-05.

When the source base station recognizes the failure of the eMBB-based handover, in response to reception of the RRC message, the source base station may maintain data transmission and reception with the UE 1e-05, and re-initialize, in response to a handover condition being satisfied, the handover procedure with respect to a certain target base station.

On the other hand, as a channel quality state between the UE 1e-05 and the source base station deteriorates, the source base station 1e-10 may be unable to receive the RRCConnectionReconfiguration message.

Figure 1F:
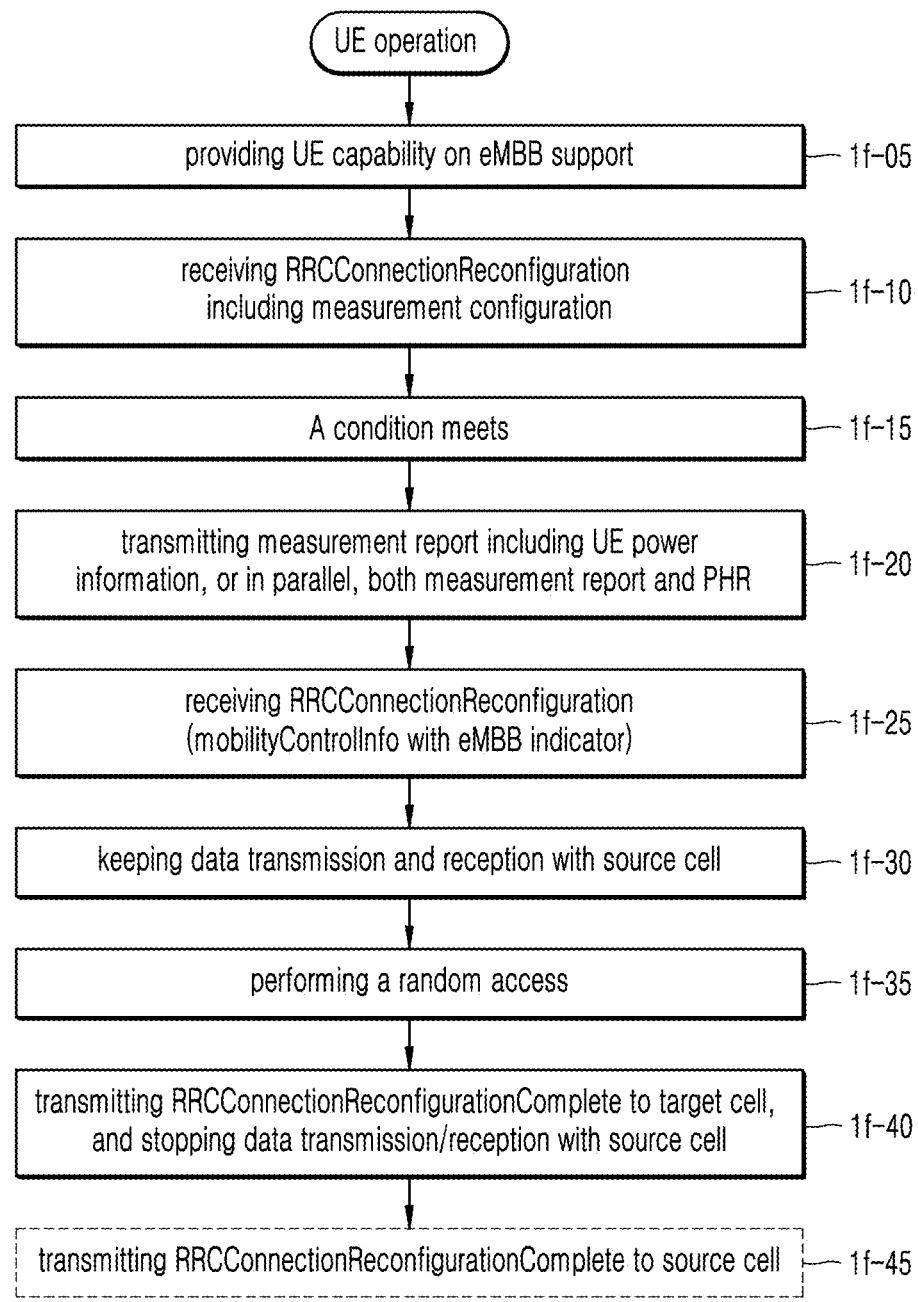
FIG. 1F is a flowchart illustrating an operation of a user equipment (UE), according to some embodiments.

FIG. 1F is a flowchart illustrating an operation of a UE, according to some embodiments.

In operation 1f-05, the UE may report, to a source base station, whether the UE supports a dual RX/TX chain or eMBB.

In operation 1f-10, the UE may receive, from the source base station, an RRCConnectionReconfiguration message including a measurement configuration.

In operation 1f-15, the UE may determine whether a predefined condition is satisfied. The predefined condition may be satisfied in a case where a condition requiring the UE to transmit the measurement report to the base station, and a condition requiring the UE to report, to the base station, the transmission power of the UE are satisfied. For example, the condition requiring the UE to report the transmission power may correspond to a case where cell measurement information included in the measurement report is expected to trigger handover to be configured. In this case, the base station may explicitly provide, by using the measurement configuration, the condition requiring the UE to report the transmission power of the UE Alternatively, the condition requiring the UE to report the transmission power may be defined to be a case where a condition of a specific event, for example, a condition of an event A3, that is a predefined specific event, is satisfied, thus the measurement report is necessary, and transmission power information of the UE is to be also reported.

In operation 1f-20, in response to the predefined condition being satisfied, the UE may transmit the measurement report to the source base station. In addition, the UE may also report, to the base station, the transmission power information of the UE. The transmission power information may be included in the measurement report or may be included in a separate RRC message or a MAC CE. For example, the MAC CE may be a power headroom report (PHR).

In operation 1f-25, the UE may receive, from the base station, an information element (IE) that indicates handover, for example, an RRCConnectionReconfiguration message including mobilityControlInfo. The IE may include an indicator that indicates to perform handover based on eMBB.

In operation 1f-30, in a case where the RRC message does not include the indicator that indicates to perform handover based on eMBB, the UE may stop, in response to the reception of the RRC message, data transmission and reception with the source base station. Alternatively, in a case where the RRC message includes the indicator that indicates to perform handover based on eMBB, the UE may maintain data transmission and reception with the source base station until a predefined time point.

In operation 1f-35, the UE may perform random access to a target base station indicated by the mobilityControlInfo.

In operation 1f-40, the UE may transmit, to the target base station, an RRCConnectionReconfigurationComplete message by using msg3 in the random access procedure, and may stop the data transmission and reception operation with the source base station.

In operation 1f-45, the UE may transmit the RRCConnectionReconfigurationComplete message to the source base station as well. The RRC message transmitted from the UE to the source base station may include an indicator that indicates whether eMBB has been successfully completed or has failed. In a case where the indicator indicates that the eMBB has been successfully completed, the source base station having received the RRC message may stop data transmission and reception with the UE. Alternatively, in a case where the eMBB has failed, the source base station having received the RRC message may maintain data transmission and reception with the UE unless an RLF occurs.

Figure 1G:
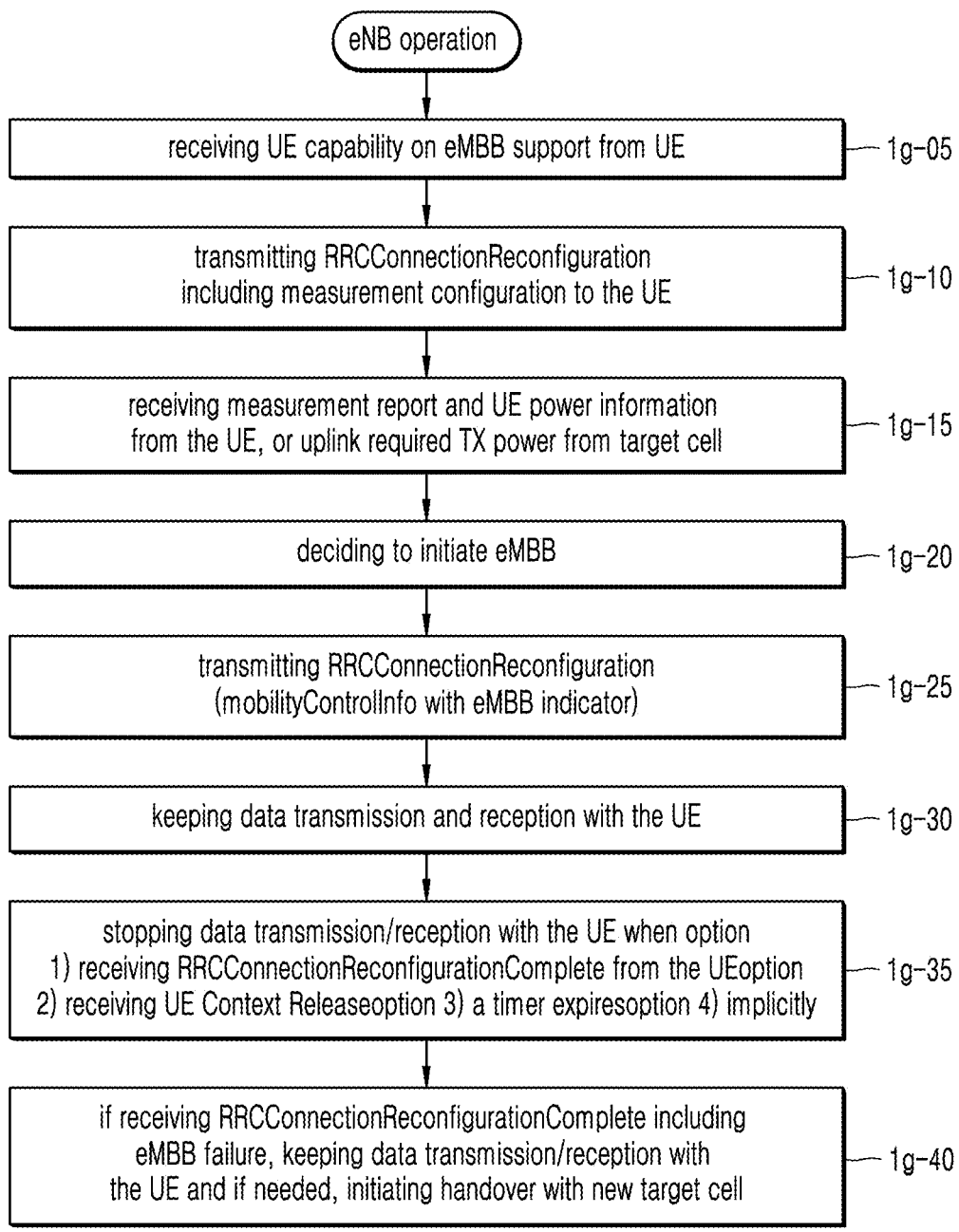
FIG. 1G is a flowchart illustrating an operation of a base station, according to some embodiments.

FIG. 1G is a flowchart illustrating an operation of a base station, according to some embodiments.

In operation 1g-05, a source base station may receive, from a UE, a report that indicates whether a dual RX/TX chain or eMBB is supported.

In operation 1g-10, the source base station may transmit, to the UE, an RRCConnectionReconfiguration message including a measurement configuration. The measurement configuration may include information about a time point at which the UE has to transmit transmission power information, and the transmission power information required to be reported.

In operation 1g-15, the source base station may receive a measurement report and UE transmission power information from the UE. The UE transmission power information may include a PH and a Pmax value of a neighboring base station. The Pmax value may be provided by the neighboring base station in advance, in which case the UE may not necessarily report information including the Pmax value to the source base station.

In operation 1g-20, the source base station may determine whether to perform eMBB-based handover, considering the received measurement report and the received UE transmission power information. For example, in a case where the source base station determined, based on measurement information with respect to a serving cell and a neighboring cell included in the measurement report, that handover to the neighboring cell is required, and the UE has sufficient transmission power to perform data transmission and reception simultaneously with a current serving cell and a neighboring target cell, the source base station may configure the eMBB-based handover.

In operation 1g-25, the source base station may transmit, to the UE, an RRCConnectionReconfiguration message including an indicator that indicates the eMBB-based handover.

In operation 1g-30, in a case where the source base station included the indicator that indicates the eMBB-based handover in the RRCConnectionReconfiguration message, the source base station may maintain data transmission and reception with the UE.

In operation 1g-35, the source base station may stop data transmission and reception with the UE according to the following options.

Option 1) The UE may transmit RRCConnectionReconfigurationComplete to the source base station as well as a target base station. The source base station stops data transmission and reception with the UE at a time point of receiving an RRC message (1d-75).

Option 2) The target base station stops data transmission and reception with the UE at a time point at which the target base station transmits a UE Context Release message to the source base station (1d-80).

Option 3) The source base station starts a specific timer at a time point of transmitting mobilityControlInfo to the UE, and stops data transmission and reception with the UE when the running timer expires (1d-85).

Option 4) The source base station stops data transmission and reception with the UE at an arbitrary time point according to the implementation (1d-90). For example, in a case where an ACK/NACK for transmitted data is not received from the UE or where any data is not received from the UE, after a certain amount of time has elapsed, the source base station stops data transmission and reception with the UE.

In operation 1g-40, in a case where the source base station receives, from the UE, RRCConnectionReconfigurationComplete that indicates an eMBB failure, the source base station may maintain data transmission and reception with the UE unless an RLF occurs.

Figure 1H:
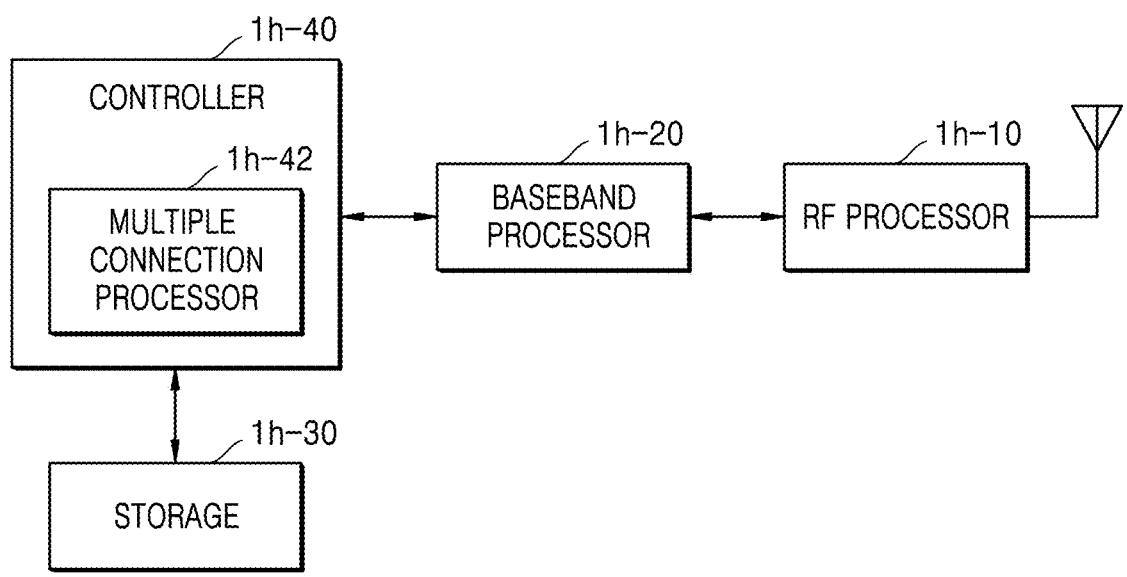
FIG. 1H is a block diagram illustrating an internal architecture of a UE, according to some embodiments.

FIG. 1H is a block diagram illustrating an internal architecture of a UE, according to some embodiments.

Referring to FIG. 1H, the UE may include a radio frequency (RF) processor 1h-10, a baseband processor 1h-20, a storage 1h-30, and a controller 1h-40.

The RF processor 1h-10 may perform functions for transmitting and receiving signals through a radio channel, such as signal band conversion, amplification, or the like. That is, the RF processor 1h-10 may up-convert a baseband signal provided from the baseband processor 1h-20 into an RF band signal and transmit the RF band signal through an antenna, and may down-convert an RF band signal received through an antenna into a baseband signal. For example, the RF processor 1h-10 may include a transmission filter, a reception filter, an amplifier, a mixer, an oscillator, a digital-to-analog converter (DAC), an analog-to-digital converter (ADC), and the like. Although only one antenna is illustrated in FIG. 1H, the UE may include a plurality of antennas. Also, the RF processor 1h-10 may include a plurality of RF chains. Furthermore, the RF processor 1h-10 may perform beamforming. For beamforming, the RF processor 1h-10 may adjust the phases and magnitudes of signals transmitted and received through a plurality of antennas or antenna elements. Also, the RF processor 1h-10 may perform MIMO and may receive a plurality of layers when performing a MIMO operation.

The baseband processor 1h-20 may perform a conversion function between a baseband signal and a bit string according to a physical layer standard of a system. For example, upon transmission of data, the baseband processor 1h-20 may encode and modulate a transmission bit string to generate complex symbols. Also, upon reception of data, the baseband processor 1h-20 may reconstruct a reception bit string by demodulating and decoding a baseband signal provided from the RF processor 1h-10. For example, in a case of conforming to an OFDM scheme, upon transmission of data, the baseband processor 1h-20 may encode and modulate a transmission bit string to generate complex symbols, map the complex symbols to sub-carriers, and configure OFDM symbols through an inverse fast Fourier transform (IFFT) operation and cyclic prefix (CP) insertion. Also, upon reception of data, the baseband processor 1h-20 may segment the baseband signal provided from the RF processor 1h-10 in units of OFDM symbols, reconstruct signals mapped to sub-carriers through a fast Fourier transform (FFT) operation, and reconstruct a reception bit string through demodulation and decoding.

The baseband processor 1h-20 and the RF processor 1h-10 may transmit and receive signals as described above. Therefore, the baseband processor 1h-20 and the RF processor 1h-10 may be referred to as a transmitter, a receiver, a transceiver, or a communicator. Furthermore, at least one of the baseband processor 1h-20 and the RF processor 1h-10 may include a plurality of communication modules so as to support a plurality of different radio access technologies. Also, at least one of the baseband processor 1h-20 and the RF processor 1h-10 may include different communication modules so as to process signals of different frequency bands. For example, the different radio access technologies may include a wireless LAN (e.g., IEEE 802.11), a cellular network (e.g., LTE), or the like. Also, the different frequency bands may include a super high frequency (SHF) (e.g., 2.5 GHz, 5 Ghz) band and a millimeter wave (e.g., 60 GHz) band.

The storage 1h-30 may store data such as basic programs, application programs, and configuration information for the operations of the UE. In particular, the storage 1h-30 may store information related to a second access node that performs wireless communication by using a second radio access technology. In addition, the storage 1h-30 may provide data stored therein at a request of the controller 1h-40.

The controller 1h-40 may control overall operations of the UE. For example, the controller 1h-40 may transmit and receive signals through the baseband processor 1h-20 and the RF processor 1h-10. Also, the controller 1h-40 may record and read data in and from the storage 1h-30. To this end, the controller 1h-40 may include at least one processor. For example, the controller 1h-40 may include a communication processor (CP) that performs control for communication, and an application processor (AP) that controls an upper layer, such as an application program. And, the controller 1h-40 may include a multiple connection processor 1h-42 that performs processing to operate in a multiple connection mode.

Figure 1I:
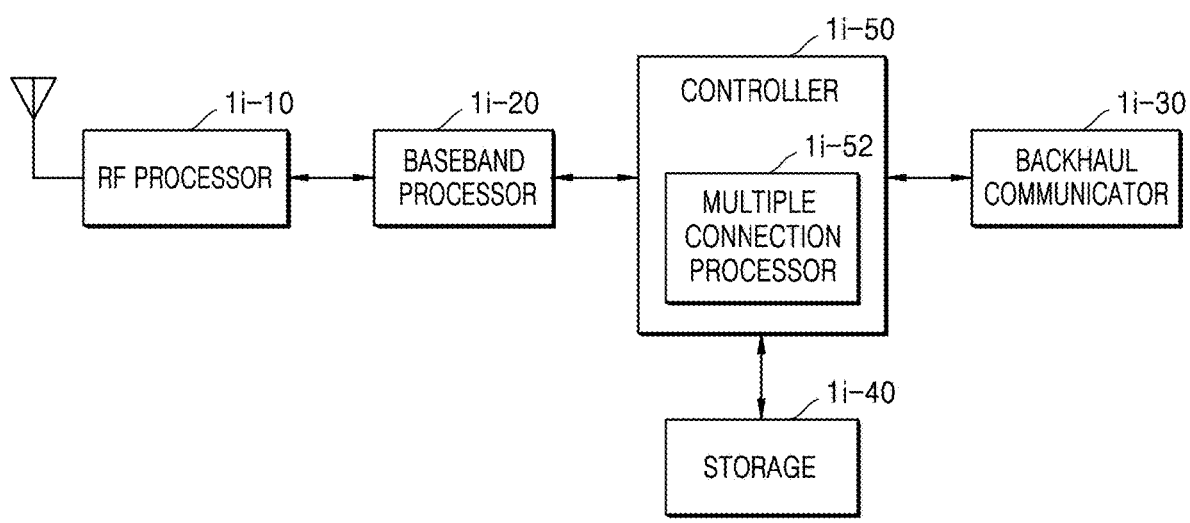
FIG. 1I is a block diagram illustrating a configuration of a base station, according to some embodiments.

FIG. 1I is a block diagram illustrating a configuration of a base station, according to some embodiments.

As illustrated in FIG. 1I, the base station may include an RF processor 1i-10, a baseband processor 1i-20, a backhaul communicator 1i-30, a storage 1i-40, and a controller 1i-50.

The RF processor 1i-10 may perform functions for transmitting and receiving signals through a radio channel, such as signal band conversion, amplification, or the like. That is, the RF processor 1i-10 may up-convert a baseband signal provided from the baseband processor 1i-20 into an RF band signal and transmit the RF band signal through an antenna, and may down-convert an RF band signal received through an antenna into a baseband signal. For example, the RF processor 1i-10 may include a transmission filter, a reception filter, an amplifier, a mixer, an oscillator, a DAC, an ADC, and the like. Although only one antenna is illustrated in FIG. 1I, a first access node may include a plurality of antennas. Also, the RF processor 1i-10 may include a plurality of RF chains. Furthermore, the RF processor 1i-10 may perform beamforming. For beamforming, the RF processor 1i-10 may adjust the phases and magnitudes of signals transmitted and received through a plurality of antennas or antenna elements. The RF processor may perform a downlink MIMO operation by transmitting one or more layers.

The baseband processor 1i-20 may perform a conversion function between a baseband signal and a bit string according to a physical layer standard of a first radio access technology. For example, upon transmission of data, the baseband processor 1i-20 may encode and modulate a transmission bit string to generate complex symbols. Also, upon reception of data, the baseband processor 1i-20 may reconstruct a reception bit string by demodulating and decoding a baseband signal provided from the RF processor 1i-10. For example, in the case of conforming to an OFDM scheme, upon transmission of data, the baseband processor 1i-20 may encode and modulate a transmission bit string to generate complex symbols, map the complex symbols to sub-carriers, and configure OFDM symbols through an IFFT operation and CP insertion. Also, upon reception of data, the baseband processor 1i-20 may segment a baseband signal provided from the RF processor 1i-10 in units of OFDM symbols, reconstruct signals mapped to sub-carriers through an FFT operation, and reconstruct a reception bit string through demodulation and decoding. The baseband processor 1i-20 and the RF processor 1i-10 may transmit and receive signals as described above. Therefore, the baseband processor 1i-20 and the RF processor 1i-10 may be referred to as a transmitter, a receiver, a transceiver, a communicator, or a wireless communicator.

The backhaul communicator 1i-30 may provide an interface for communicating with other nodes in a network. That is, the backhaul communicator 1i-30 may convert a bit string to be transmitted from a master base station to another node, for example, a secondary base station, a core network, or the like, into a physical signal, and convert a physical signal received from another node into a bit string.

The storage 1i-40 may store data such as basic programs, application programs, and configuration information for the operations of the master base station. In particular, the storage 1i-40 may store information about bearers allocated to a connected UE, measurement results reported from the connected UE, or the like. Also, the storage 1i-40 may store information that is a criterion for determining whether to provide multiple connections to the UE or to stop multiple connections. The storage 1i-40 may provide data stored therein at a request of the controller 1i-50.

The controller 1i-50 may control overall operations of the master base station. For example, the controller 1i-50 may transmit and receive signals through the baseband processor 1i-20 and the RF processor 1i-10 or through the backhaul communicator 1i-30. Also, the controller 1i-50 may record and read data in and from the storage 1i-40. To this end, the controller 1i-50 may include at least one processor. And, the controller 1i-50 may include a multiple connection processor 1i-52 that performs processing to operate in a multiple connection mode.

Figure 2A:
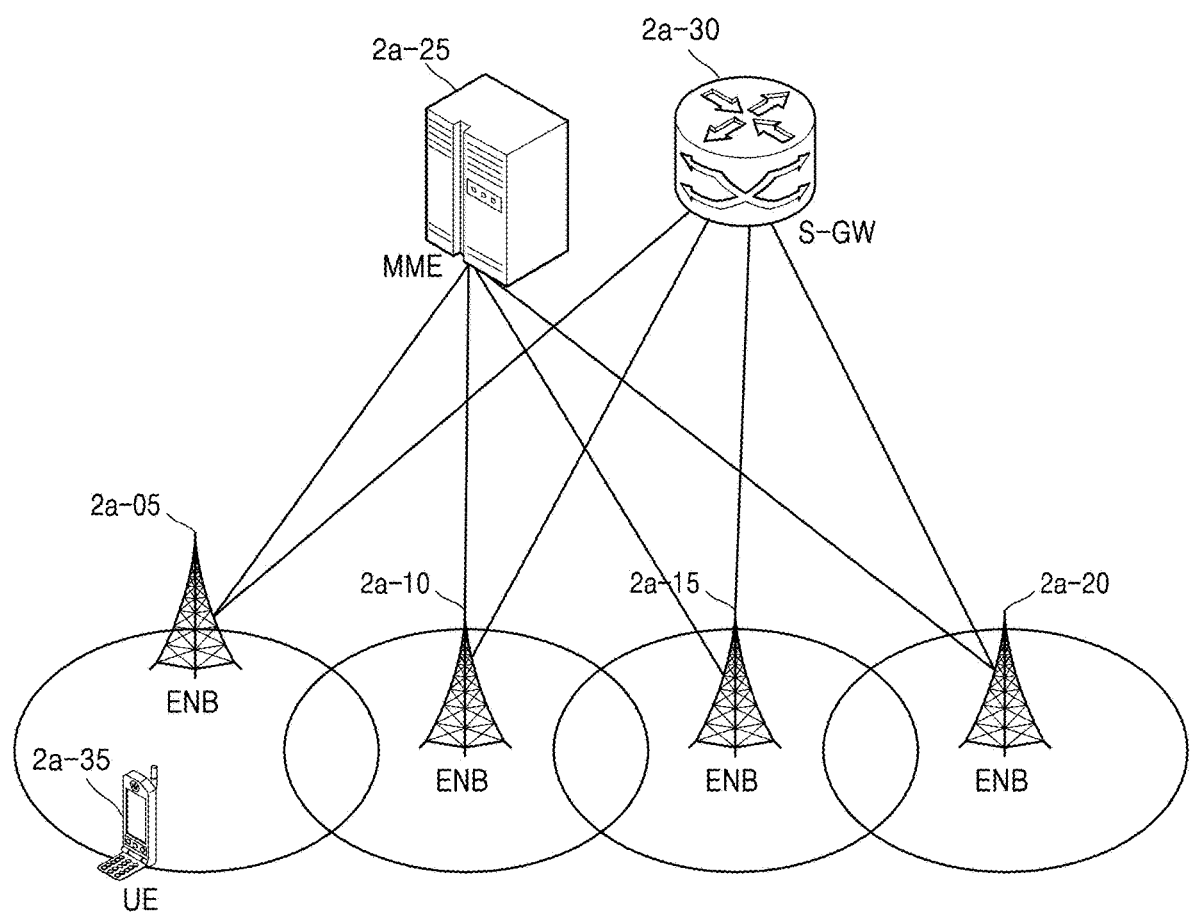
FIG. 2A is a diagram illustrating an architecture of an LTE system, according to some embodiments.

FIG. 2A is a diagram illustrating an architecture of an LTE system, according to some embodiments.

Referring to FIG. 2A, a radio access network of the LTE system may include Evolved Node Bs (hereinafter, referred to as ENBs, Node Bs, or base stations) 2a-05, 2a-10, 2a-15, and 2a-20, a mobility management entity (MME) 2a-25, and a serving-gateway (S-GW) a-30. A user equipment (hereinafter, referred to as a UE or a terminal) 2a-35 may access an external network through the ENBs 2a-05 to 2a-20 and the S-GW 2a-30.

In FIG. 2A, the ENBs 2a-05 to 2a-20 may correspond to an existing Node B of a UMTS. The ENB may be connected to the UE 2a-35 through a wireless channel and may serve more complicated roles than the existing Node B. In the LTE system, because all user traffics including real-time services such as Voice over IP (VoIP) through an Internet protocol are provided through a shared channel, a device for collecting and scheduling status information such as buffer status, available transmission power status, and channel status of UEs may be required, and this may be handled by the ENBs 2a-05 to 2a-20. One ENB may generally control a plurality of cells. For example, in order to implement a transmission rate of 100 Mbps, the LTE system may use, for example, an orthogonal frequency division multiplexing (hereinafter, referred to as OFDM) scheme in a 20-MHz bandwidth as a radio access technology. Also, a modulation scheme and an adaptive modulation and coding (hereinafter, referred to as AMC) scheme that determines a channel coding rate may be applied according to the channel status of the UE. The S-GW 2a-30 is a device that provides data bearers, and may generate or remove data bearers under the control by the MME 2a-25. The MME is a device that is responsible for various control functions as well as mobility management functions for the UE, and may be connected to a plurality of base stations.

Figure 2B:
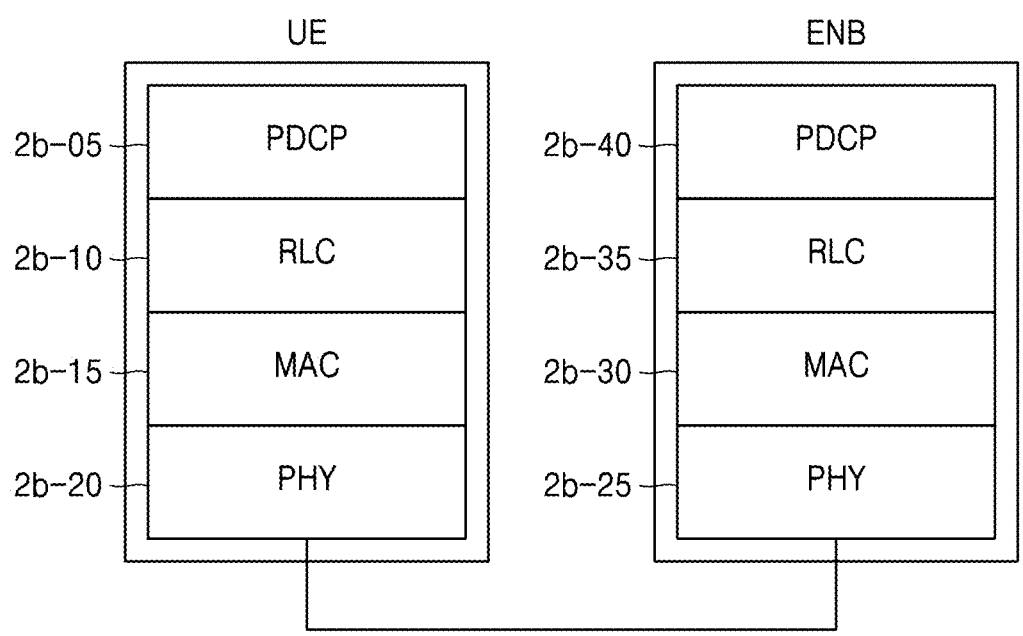
FIG. 2B is a diagram illustrating a radio protocol architecture of the LTE system, according to some embodiments.

FIG. 2B is a diagram illustrating a radio protocol architecture of the LTE system, according to some embodiments.

Referring to FIG. 2B, in a radio protocol of the LTE system, a UE and an ENB may respectively include packet data convergence protocols (PDCPs) 2b-05 and 2b-40, radio link controls (RLCs) 2b-10 and 2b-35, and medium access controls (MACs) 2b-15 and 2b-30. The packet data convergence protocols (PDCPs) 2b-05 and 2b-40 may be responsible for operations such as IP header compression/decompression, and the radio link controls (hereinafter, referred to as RLCs) 2b-10 and 2b-35 may perform an ARQ operation by reconfiguring a PDCP PDU to an appropriate size. The MACs 2b-15 and 2b-30 may be connected to RLC layer entities configured in one UE, and may perform an operation of multiplexing RLC PDUs to MAC PDUs and demultiplexing RLC PDUs from MAC PDUs. Physical layers 2b-20 and 2b-25 perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the decoded OFDM symbols to an upper layer.

Figure 2C:
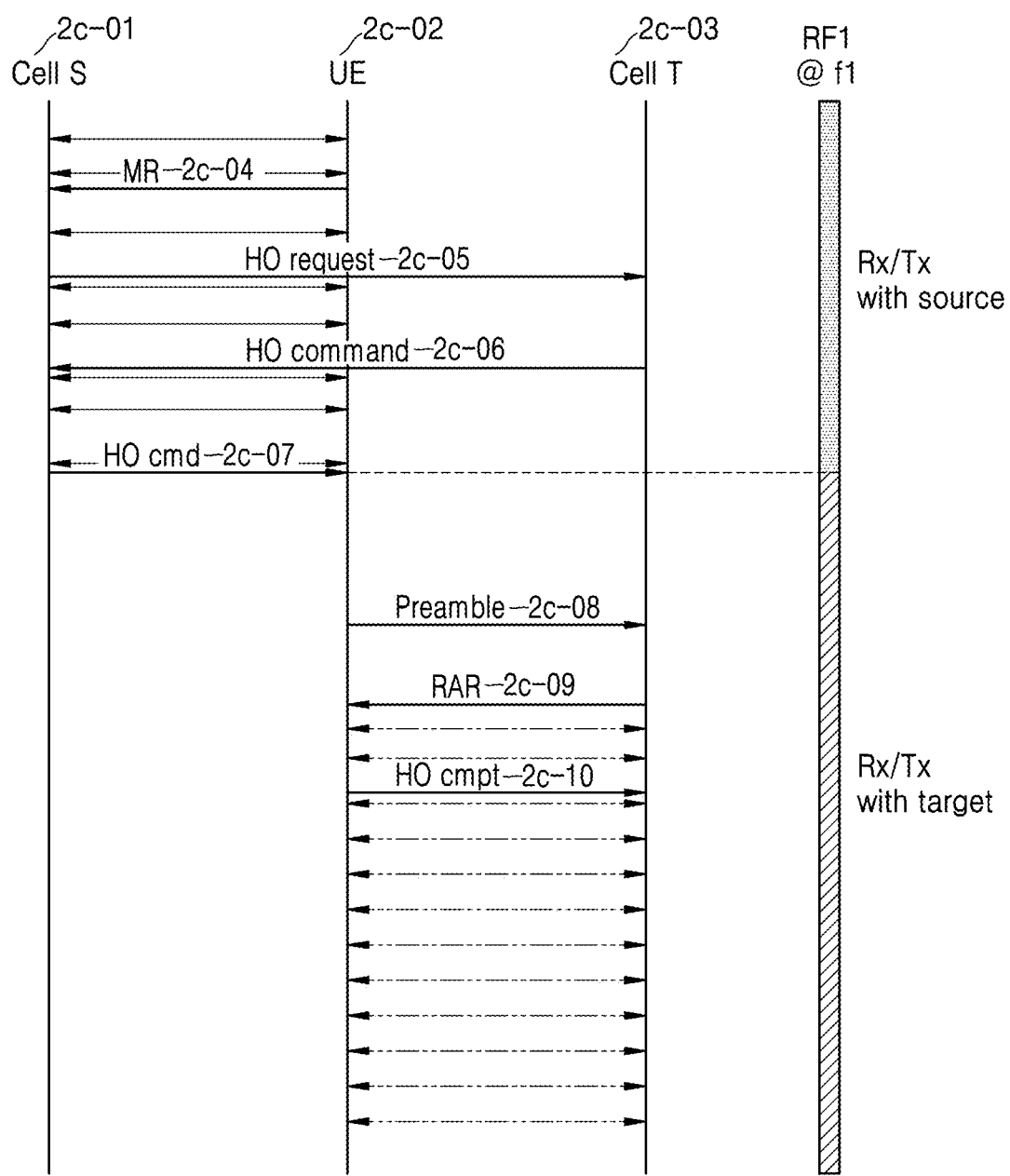
FIG. 2C is a diagram illustrating a handover procedure in the LTE system, according to some embodiments.

FIG. 2C is a diagram illustrating a handover procedure in the LTE system, according to some embodiments.

A UE 2c-02 that is in a connection mode may transmit a cell measurement report to a current serving cell 2c-01 periodically or when a predefined event is satisfied (2c-04). The serving cell (or source cell) 2c-01 may determine whether the UE 2c-02 is to perform handover to a neighboring cell, based on the cell measurement report. Handover is a technique of changing a primary cell that provides a service to a UE that is in a connection mode, to one of neighboring cells. The serving cell 2c-01 may request, for handover, a new cell, i.e., a target cell 2c-03 that is to provide the service to the UE 2c-02 (2c-05). In a case where the target cell 2c-03 accepts the request, the target cell 2c-03 may transmit a HO command message to the current serving cell 2c-01 (2c-06). The serving cell 2c-01 may transmit the received HO command to the UE 2c-02 by using an RRC Connection Reconfiguration message (2c-07). At the same time, data transmission and reception between the serving cell 2c-01 and the UE 2c-02 may be stopped. The UE 2c-02 may attempt random access to the target cell 2c-03 indicated by the serving cell 2c-01 (2c-08). The random access may be an operation of notifying the target cell 2c-03 that the UE 2c-02 is to be transferred to the target cell 2c-03, and, performing uplink synchronization at the same time. In order to perform the random access, the UE 2c-02 may transmit, to the target cell 2c-03, a preamble ID provided from the serving cell 2c-01 or a preamble corresponding to a randomly selected preamble. After a certain number of subframes since the transmission of the preamble by the UE 2c-02, the UE 2c-02 may monitor whether a random access response (RAR) is transmitted from the target cell 2c-03. A time interval during which the UE 2c-02 monitors whether the random access response is transmitted from the target cell 2c-03 may be referred to as a random access response window (RAR window). During the RAR window, when the RAR is transmitted (2c-09), the UE 2c-02 may respond to the target cell 2c-03 with an RRC Connection Reconfiguration Complete message (2c-10). Accordingly, from the beginning of the RAR window, the UE 2c-02 may attempt to receive data from the target cell, and, after the RAR is received, may start transmission to the target cell 2c-03 by transmitting the RRC Connection Reconfiguration Complete message to the target cell 2c-03.

In the above-described conventional handover procedure, a specific UE is unable to transmit its own data or receive data for a time interval between a time point at which the UE receives the HO command from the current serving cell, and a time point at which the handover is completed and the UE transmits the RRC Connection Reconfiguration Complete message. Such a state in which data transmission and reception are interrupted causes a certain time delay that is called an interruption time. In order to reduce the interruption time, an improvement in that the UE maintains data transmission and reception with the source cell until a time point at which the UE transmits a first preamble to the target cell, rather than the time point at which the UE receives the HO command. This scheme is referred to as a Make Before Break (MBB) technique. This was developed in consideration of a UE with a single RX/TX chain. Although the MBB may reduce the interruption time compared to the conventional handover procedure, there is still the remaining interruption time between the time point at which the UE transmits the preamble and the time point at which the UE transmits the RRC Connection Reconfiguration Complete message to the target cell. The present disclosure assumes an eMBB technique in which a UE with a dual RX/TX RF chain maintains data transmission and reception with a source cell even after transmitting a preamble to a target cell. Here, the present disclosure proposes a condition for declaring an RLF.

Figure 2D:
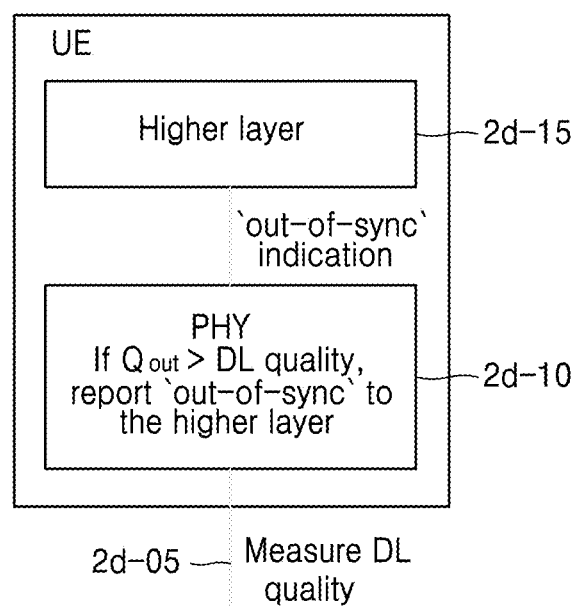
FIG. 2D is a diagram illustrating a radio link monitoring (RLM) operation, according to some embodiments.

FIG. 2D is a diagram illustrating a radio link monitoring (RLM) operation, according to some embodiments.

A UE physical layer may measure a downlink signal quality based on a common reference signal (CRS) of a serving cell (2d-05). The UE physical layer may determine whether a measured signal quality is lower than a preset threshold Qout (2d-10). The preset threshold may be a signal quality value corresponding to a specific block error rate (BLER) measured in a physical downlink control channel (PDCCH). In a case where the measured signal quality is lower than the preset threshold Qout, the UE physical layer may transmit an 'out-of-sync' indicator to an upper layer. In the LTE technology, the above-described operation may be referred to as RLM. In a case where the 'out-of-sync' indicator has been transmitted to a UE upper layer a preset number of times or more, the UE upper layer may start a specific timer, and, when the running timer expires, may declare a radio link failure (RLF) (2d-15).

Figure 2E:
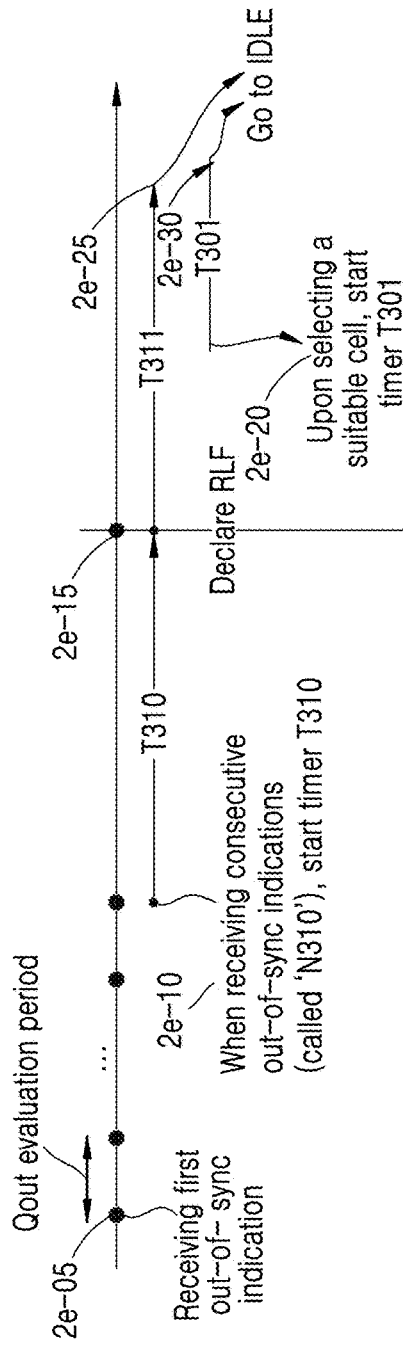
FIG. 2E is a diagram illustrating a radio link failure (RLF) operation, according to some embodiments.
Figure 2E:
Figure 2E:
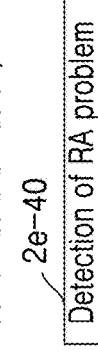
Figure 2E:
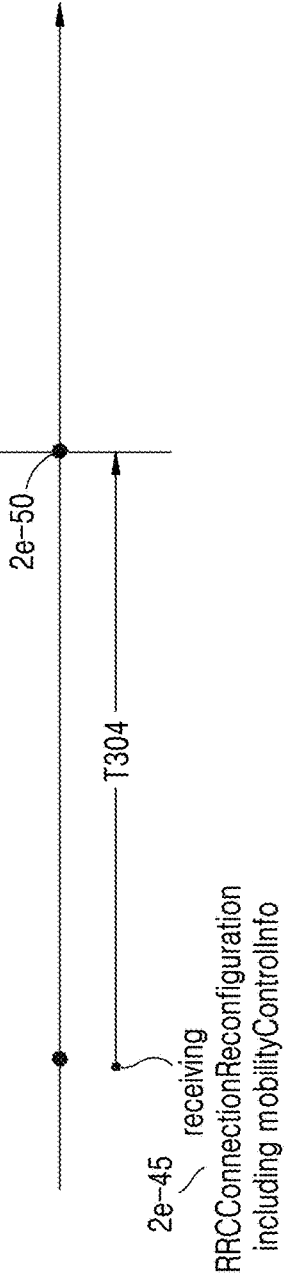

FIG. 2E is a diagram illustrating a radio link failure (RLF) operation, according to some embodiments.

As described above, an RLF may be declared according to a result of RLM. A UE physical layer may determine whether a downlink signal quality is lower than a preset threshold Qout, based on a CRS of a serving cell at a specific cycle or every Qout evaluation period. In a case where the downlink signal quality is lower than the preset threshold Qout, the UE physical layer may transmit an 'out-of-sync' indicator to an upper layer. In a case where, after the 'out-of-sync' indicator is transmitted to the upper layer (2e-05), the 'out-of-sync' indicator is transmitted to the upper layer a preset number of times N310, a specific timer T310 may be started (2e-10). The UE physical layer may also determine whether the downlink signal quality is higher than a preset threshold Qin, based on the CRS of the serving cell. In a case where the downlink signal quality is higher than the preset threshold Qin, the UE physical layer may transmit an 'in-sync' indicator to the upper layer. In a case where the 'in-sync' indicator is transmitted to the upper layer a preset number of times, the UE may terminate the operation of the T310. In a case where the T310 timer expires without being stopped, the upper layer may declare an RLF (2e-15). After declaring the RLF, the UE may start another timer T311. The UE may search for a new suitable cell, and, in a case where the UE has not found the new suitable cell until the timer T311 expires, the UE may be switched to an idle mode (2e-25). In a case where the UE finds the new suitable cell before the timer T311 expires, the UE may start a timer T301, and perform a re-establishment procedure based on the found suitable cell (2e-20). In a case where the re-establishment procedure is not successfully completed until the timer T301 expires, the UE may be switched to the idle mode (2e-30). In a case where the re-establishment procedure is successfully completed, the UE may maintain a connection mode with respect to the cell. An RLF may be declared by the above-described RLM operation, and may also be declared according to another condition. An RLF may be declared in a case where random access fails as well (2e-35). Furthermore, in a case where a maximum number of times of re-transmission is reached in the RLC layer, but a packet is not successfully transmitted, an RLF may be declared (2e-40).

Another case of declaring an RLF may be where handover fails. In response to an RRCConnectionReconfiguration message including handover configuration information and a mobilityControlInfo IE being received (2e-45), the UE may start the timer T304. A timer value of the timer T304 may be provided in mobilityControlInfo. In a case where random access to a target cell is not successfully completed until the timer T304 expires, the UE may consider that the handover has failed, and may declare an RLF (2e-50).

FIG. 2F is a flowchart illustrating a process of declaring an RLF during an eMBB operation, according to some embodiments.

A UE 2f-05 with a dual RX/TX chain may report, to a source base station 1f-10, that the UE 2f-05 supports a dual RX/TX chain. Alternatively, the UE 2f-05 may report, to the source base station 2f-10, that the UE 2f-05 supports an eMBB operation (2f-20). The dual RX/TX chain may mean an RF module capable of receiving data simultaneously from two different downlink radio links and transmitting data simultaneously to the two different downlink radio links. The source base station 2f-10 may configure a measurement configuration for mobility support for the UE 2f-05, by using an RRCConnectionReconfiguration message (2f-25). In a case where a condition for triggering handover is satisfied and the UE 2f-05 is required to transmit a measurement report to the base station 2f-10 periodically or based on an event (2f-40), the UE may include, in the measurement report, information related to transmission power of the UE and UE transmission power information required by neighboring cells. For example, the information related to transmission power of the UE may include power headroom (PH) information of the UE. A PH value may mean the remaining power that the UE may additionally consume to transmit data. In addition, the information related to transmission power of the UE may include a current (average) power consumption of the UE, the maximum transmission power of the UE, and the like. The UE transmission power information required by the neighboring cells (those expected to be a target cell) may be a Pmax value. The Pmax value may be minimum UE transmission power required for a signal transmitted from a UE to be obtained by a base station in an uplink. The UE 2f-05 may obtain the Pmax value from system information of a target cell 2f-15 (hereinafter, also referred to as the target base station 2f-15) (2f-35), and report the obtained Pmax value to a source cell. However, the Pmax value may not be frequently changed, and the source cell may obtain and store the Pmax value from a neighboring target cell in advance according to the implementation or a standard procedure, and thus, the UE 2f-05 may not necessarily report the Pmax value to the source cell. For example, when the source cell requests the target cell for handover, the target cell may include the Pmax value in an acknowledgement message for the request. The above-described power information may not be included in the measurement report, and may be included in a separate RRC message or a MAC CE (e.g., a power headroom report (PHR)) to be reported to the source base station 2f-10. However, the above-described power information may have to be reported to the source base station 2f-10 at a time point that is substantially identical to a time point at which the measurement report is transmitted. The above-described power information may be used for the source base station 2f-10 to determine an eMBB configuration. In a case where the UE 2f-05 has a dual RX/TX chain but does not have a sufficient transmission power amount to perform data transmission and reception simultaneously with the two base stations 2f-10 and 2f-15, eMBB cannot be configured. As a solution to this problem, a time period during which the UE 2f-05 is able to perform data transmission and reception with the two base stations 2f-10 and 2f-15 may be divided, and the UE 2f-05 may be restricted to transmit data to only one base station at one time interval. To this end, a TDM pattern that indicates the time division has to be provided to the UE 2f-05 in advance, and an exceptional situation, in which the TDM pattern is ignored in a specific case and the UE has to transmit data to one base station by priority, may have to be defined. The exceptional situation may mean a situation in which transmission (e.g., preamble or msg3 transmission to the target cell) is required to be performed for establishing a connection with a specific base station, and the UE 2f-05 may ignore the TDM pattern and perform transmission to the target cell 2f-15. The source base station 2f-10 having received the measurement report may determine whether to perform handover with a specific neighboring base station, based on cell measurement information included in the measurement report. In addition, the source base station 2f-10 may transmit a handover request message to the target base station 2f-15, and the target base station 2f-15 may transmit, to the source base station 2f-10, an acknowledgement message for the handover request message (2f-50). The handover request message transmitted from the source base station 2*f*-10 to the target base station 2*f*-15 may include an indicator that indicates that the UE 2*f*-05 is to perform eMBB. The acknowledgement message transmitted from the target base station 2*f*-15 to the source base station 2*f*-10 may include configuration information necessary for the UE 2*f*-05 to access the target cell 2*f*-15. The source base station 2*f*-10 may transmit, to the UE 2*f*-05, handover configuration information, mobilityControlInfo, and the like, by using RRCConnectionReconfiguration (2*f*-55). The UE 2*f*-05 having received an RRC message including the mobilityControlInfo may start the timer T304. The mobilityControlInfo may include an indicator that indicates handover using eMBB. The UE 2*f*-05 having received the indicator that indicates handover using eMBB may maintain data transmission and reception with the source cell even after transmitting a first preamble to the target cell (2*f*-60). In a case where the UE 2*f*-05 has successfully transmitted, to the target cell, an RRCConnectionReconfigurationComplete message in msg3 in a random access procedure 2*f*-65 to the target cell, the UE 2*f*-05 may consider that the handover has been successfully performed. On the other hand, in a case where the UE 2*f*-05 has not successfully transmitted the RRC message to the target base station until the timer T304 expires (2*f*-75), the UE 2*f*-05 may consider that the handover has failed.

In the present embodiment, in a case where the state of a channel between the UE 2*f*-05 and the source base station 2*f*-10 is good and data transmission and reception therebetween are being performed, the UE 2*f*-05 may not declare an RLF despite the handover failure. The UE 2*f*-05 may finally declare an RLF only in a case where handover to the target base station 2*f*-15 has failed and an RLF declaration condition (physical layer problem, RA problem, or RLC problem described above) is satisfied with respect to the source base station 2*f*-10. On the other hand, in a case where it is considered that the handover to the target base station 2*f*-15 has been successfully completed, and the RLF declaration condition is satisfied with respect to the source base station 2*f*-10, an RLF may not be declared. In other words, the UE 2*f*-05 may finally declare an RLF only in a case where a condition that both the source and target base stations 2*f*-10 and 2*f*-15 are able to declare an RLF is satisfied (2*f*-80).

In a case where an RLF is declared, the UE 2*f*-05 may have to perform a cell selection operation, and may perform a re-establishment operation with respect to a cell that satisfies a cell selection condition. Accordingly, in a case where one radio link of the two base stations is valid, it may be preferable that the UE 2*f*-05 does not perform an RLF operation. Therefore, the present disclosure proposes that an RLF is declared only in a case where the RLF declaration condition is satisfied with respect to both of the two base stations, during an eMBB-based handover procedure.

Figure 2G:
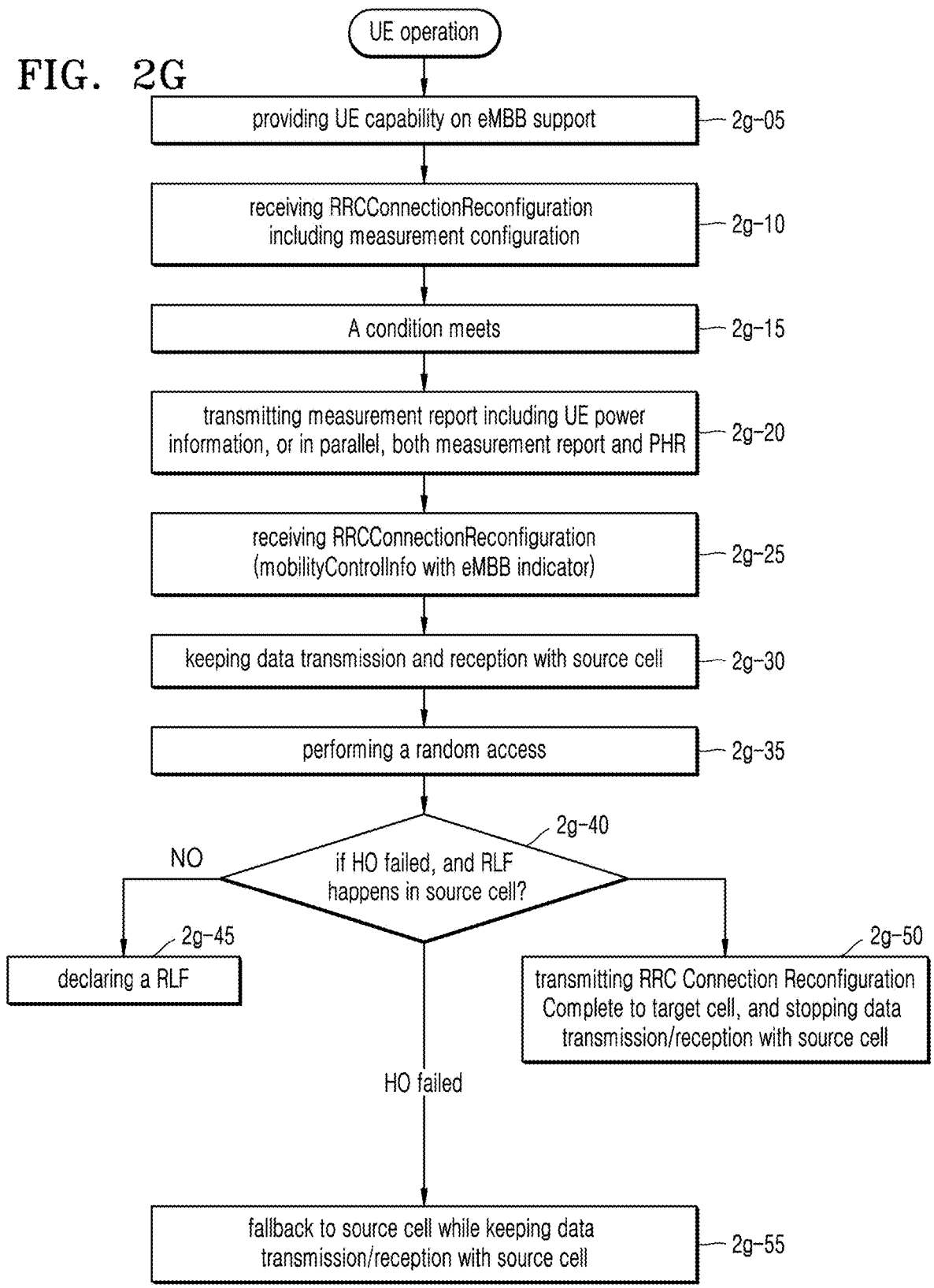
FIG. 2G is a flowchart illustrating an operation of a UE, according to some embodiments.

FIG. 2G is a flowchart illustrating an operation of a UE, according to some embodiments.

In operation 2*g*-05, the UE may report, to a source base station, whether the UE supports a dual RX/TX chain or eMBB.

In operation 2*g*-10, the UE may receive, from the source base station, an RRCConnectionReconfiguration message including a measurement configuration.

In operation 2*g*-15, the UE may determine whether a predefined condition is satisfied. The predefined condition may be satisfied in a case where a condition requiring the UE to transmit the measurement report to the base station, and a condition requiring the UE to be required to report, to the base station, the transmission power of the UE are satisfied. For example, the condition requiring the UE to report the transmission power may correspond to a case where cell measurement information included in the measurement report is expected to trigger handover to be configured. In this case, the base station may explicitly provide, by using the measurement configuration, the condition requiring the UE to report the transmission power of the UE Alternatively, the condition requiring the UE to report the transmission power may be defined to be a case where a condition of a specific event, for example, a condition of an event A3, that is a predefined specific event, is satisfied, thus the measurement report is necessary, and transmission power information of the UE is to be also reported.

In operation 2*g*-20, in response to the predefined condition being satisfied, the UE may transmit the measurement report to the source base station. In addition, the UE may also report, to the base station, the transmission power information of the UE. The transmission power information may be included in the measurement report or may be included in a separate RRC message or a MAC CE. For example, the MAC CE may be a power headroom report (PHR).

In operation 2*g*-25, the UE may receive, from the base station, an information element (IE) that indicates handover, for example, an RRCConnectionReconfiguration message including mobilityControlInfo. The IE may include an indicator that indicates to perform handover based on eMBB.

In operation 2*g*-30, in a case where the RRC message does not include the indicator that indicates to perform handover based on eMBB, the UE may stop, in response to the reception of the RRC message, data transmission and reception with the source base station. Alternatively, in a case where the RRC message includes the indicator that indicates to perform handover based on eMBB, the UE may maintain data transmission and reception with the source base station until a predefined time point.

In operation 2*g*-35, the UE may perform random access to a target base station indicated by the mobilityControlInfo.

In operation 2*g*-40, the UE may determine whether the handover has failed and, simultaneously, the RLF declaration condition with respect to the source base station is satisfied.

In operation 2*g*-45, in a case where the handover has failed and the RLF declaration condition is satisfied respectively for the two base stations, the UE may finally declare an RLF. In a case where the RLF is declared, the UE may perform the cell selection operation, and may perform the re-establishment operation with respect to a cell that satisfies the cell selection condition.

In operation 2*g*-50, in a case where the handover is successfully completed, the RLF may not be necessarily declared regardless of whether the RLF declaration condition is satisfied with respect to the source base station. In addition, the UE may terminate data transmission and reception with the source base station.

Figure 2H:
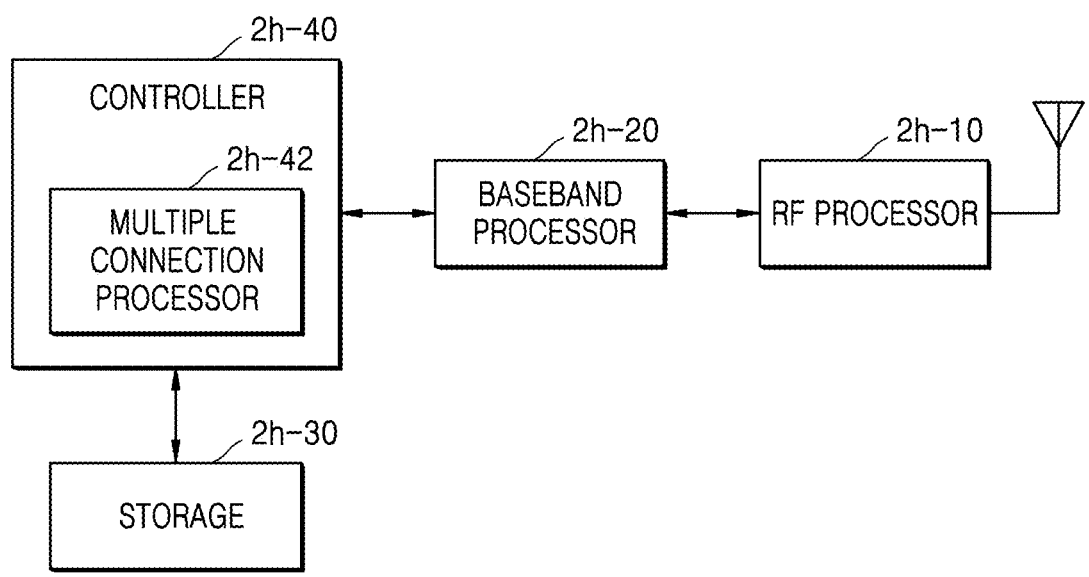
FIG. 2H is a block diagram illustrating an internal architecture of a UE, according to some embodiments.

FIG. 2H is a block diagram illustrating an internal architecture of a UE, according to some embodiments.

Referring to FIG. 2H, the UE may include a radio frequency (RF) processor 2*h*-10, a baseband processor 2*h*-20, a storage 2*h*-30, and a controller 2*h*-40.

The RF processor 2*h*-10 may perform functions for transmitting and receiving signals through a radio channel, such as signal band conversion, amplification, or the like. That is, the RF processor 2*h*-10 may up-convert a baseband signal provided from the baseband processor 2*h*-20 into an RF band signal and transmit the RF band signal through an antenna, and may down-convert an RF band signal received through an antenna into a baseband signal. For example, the RF processor 2h-10 may include a transmission filter, a reception filter, an amplifier, a mixer, an oscillator, a digital-to-analog converter (DAC), an analog-to-digital converter (ADC), and the like. Although only one antenna is illustrated in FIG. 2H, the UE may include a plurality of antennas. Also, the RF processor 2h-10 may include a plurality of RF chains. Furthermore, the RF processor 2h-10 may perform beamforming. For beamforming, the RF processor 2h-10 may adjust the phases and magnitudes of signals transmitted and received through a plurality of antennas or antenna elements. Also, the RF processor 2h-10 may perform multiple input multiple output (MIMO) and may receive a plurality of layers when performing a MIMO operation.

The baseband processor 2h-20 may perform a conversion function between a baseband signal and a bit string according to a physical layer standard of a system. For example, upon transmission of data, the baseband processor 2h-20 may encode and modulate a transmission bit string to generate complex symbols. Also, upon reception of data, the baseband processor 2h-20 may reconstruct a reception bit string by demodulating and decoding a baseband signal provided from the RF processor 2h-10. For example, in a case of conforming to an orthogonal frequency division multiplexing (OFDM) scheme, upon transmission of data, the baseband processor 2h-20 may encode and modulate a transmission bit string to generate complex symbols, map the complex symbols to sub-carriers, and configure OFDM symbols through an inverse fast Fourier transform (IFFT) operation and cyclic prefix (CP) insertion. Also, upon reception of data, the baseband processor 2h-20 may segment the baseband signal provided from the RF processor 2h-10 in units of OFDM symbols, reconstruct signals mapped to sub-carriers through a fast Fourier transform (FFT) operation, and reconstruct a reception bit string through demodulation and decoding.

The baseband processor 2h-20 and the RF processor 2h-10 may transmit and receive signals as described above. Therefore, the baseband processor 2h-20 and the RF processor 2h-10 may be referred to as a transmitter, a receiver, a transceiver, or a communicator. Furthermore, at least one of the baseband processor 2h-20 and the RF processor 2h-10 may include a plurality of communication modules so as to support a plurality of different radio access technologies. Also, at least one of the baseband processor 2h-20 and the RF processor 2h-10 may include different communication modules so as to process signals of different frequency bands. For example, the different radio access technologies may include a wireless LAN (e.g., IEEE 802.11), a cellular network (e.g., LTE), or the like. Also, the different frequency bands may include a super high frequency (SHF) (e.g., 2.5 GHz, 5 Ghz) band and a millimeter wave (e.g., 60 GHz) band.

The storage 2h-30 may store data such as basic programs, application programs, and configuration information for the operations of the UE. In particular, the storage 2h-30 may store information related to a second access node that performs wireless communication by using a second radio access technology. In addition, the storage 2h-30 may provide data stored therein at a request of the controller 2h-40.

The controller 2h-40 may control overall operations of the UE. For example, the controller 2h-40 may transmit and receive signals through the baseband processor 2h-20 and the RF processor 2h-10. Also, the controller 2h-40 may record and read data in and from the storage 2h-30. To this end, the controller 2h-40 may include at least one processor. For example, the controller 2h-40 may include a communication processor (CP) that performs control for communication, and an application processor (AP) that controls an upper layer, such as an application program. And, the controller 2h-40 may include a multiple connection processor 2h-42 that performs processing to operate in a multiple connection mode.

Figure 2I:
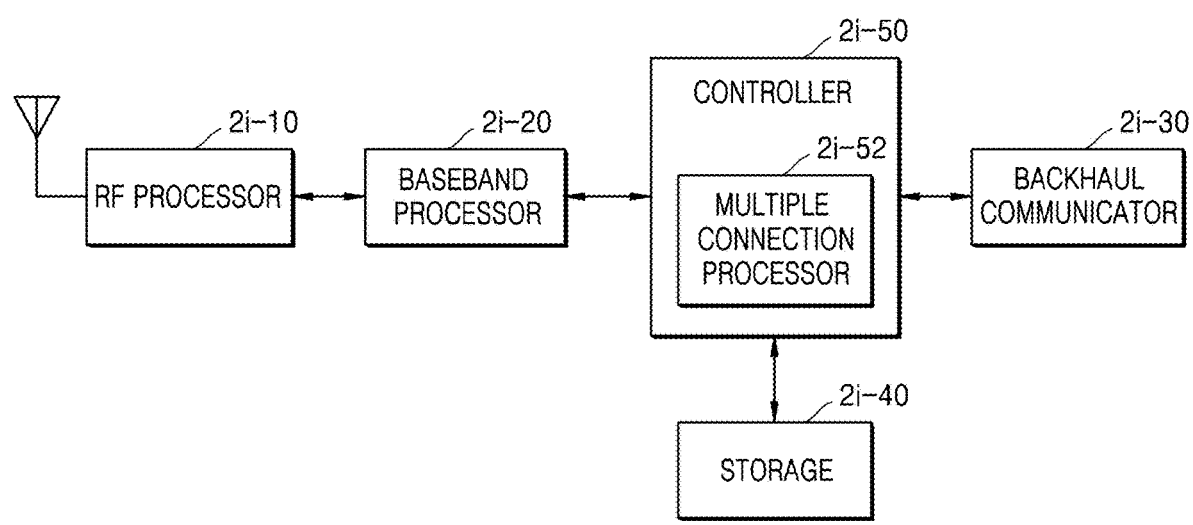
FIG. 2I is a block diagram illustrating a configuration of a base station, according to some embodiments.

FIG. 2I is a block diagram illustrating a configuration of a base station, according to some embodiments.

As illustrated in FIG. 2I, the base station may include an RF processor 2i-10, a baseband processor 2i-20, a backhaul communicator 2i-30, a storage 2i-40, and a controller 2i-50.

The RF processor 2i-10 may perform functions for transmitting and receiving signals through a radio channel, such as signal band conversion, amplification, or the like. That is, the RF processor 2i-10 may up-convert a baseband signal provided from the baseband processor 2i-20 into an RF band signal and transmit the RF band signal through an antenna, and may down-convert an RF band signal received through an antenna into a baseband signal. For example, the RF processor 2i-10 may include a transmission filter, a reception filter, an amplifier, a mixer, an oscillator, a DAC, an ADC, and the like. Although only one antenna is illustrated in FIG. 2I, a first access node may include a plurality of antennas. Also, the RF processor 2i-10 may include a plurality of RF chains. Furthermore, the RF processor 2i-10 may perform beamforming. For beamforming, the RF processor 2i-10 may adjust the phases and magnitudes of signals transmitted and received through a plurality of antennas or antenna elements. The RF processor may perform a downlink MIMO operation by transmitting one or more layers.

The baseband processor 2i-20 may perform a conversion function between a baseband signal and a bit string according to a physical layer standard of a first radio access technology. For example, upon transmission of data, the baseband processor 1i-20 may encode and modulate a transmission bit string to generate complex symbols. Also, upon reception of data, the baseband processor 2i-20 may reconstruct a reception bit string by demodulating and decoding a baseband signal provided from the RF processor 2i-10. For example, in the case of conforming to an OFDM scheme, upon transmission of data, the baseband processor 2i-20 may encode and modulate a transmission bit string to generate complex symbols, map the complex symbols to sub-carriers, and configure OFDM symbols through an IFFT operation and CP insertion. Also, upon reception of data, the baseband processor 2i-20 may segment a baseband signal provided from the RF processor 2i-10 in units of OFDM symbols, reconstruct signals mapped to sub-carriers through an FFT operation, and reconstruct a reception bit string through demodulation and decoding. The baseband processor 2i-20 and the RF processor 2i-10 may transmit and receive signals as described above. Therefore, the baseband processor 2i-20 and the RF processor 2i-10 may be referred to as a transmitter, a receiver, a transceiver, a communicator, or a wireless communicator.

The backhaul communicator 2i-30 may provide an interface for communicating with other nodes in a network. That is, the backhaul communicator 2i-30 may convert a bit string to be transmitted from a master base station to another node, for example, a secondary base station, a core network, or the like, into a physical signal, and convert a physical signal received from another node into a bit string.

The storage 2i-40 may store data such as basic programs, application programs, and configuration information for the operations of the master base station. In particular, the storage 2i-40 may store information about bearers allocated to a connected UE, measurement results reported from the connected UE, or the like. Also, the storage 2i-40 may store information that is a criterion for determining whether to provide multiple connections to the UE or to stop multiple connections. The storage 2i-40 may provide data stored therein at a request of the controller 2i-50.

The controller 2i-50 may control overall operations of the master base station. For example, the controller 2i-50 may transmit and receive signals through the baseband processor 2i-20 and the RF processor 2i-10 or through the backhaul communicator 2i-30. Also, the controller 2i-50 may record and read data in and from the storage 2i-40. To this end, the controller 2i-50 may include at least one processor. And, the controller 2i-50 may include a multiple connection processor 2i-52 that performs processing to operate in a multiple connection mode.

The methods according to the embodiments of the present disclosure, which are described in the claims or the specification, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the present disclosure, which are described in the claims or the specification of the present disclosure.

Such programs (software modules, software, etc.) may be stored in random access memory (RAM), non-volatile memory including flash memory, read-only memory (ROM), electrically erasable programmable ROM (EEPROM), magnetic disc storage device, compact disc-ROM (CD-ROM), digital versatile discs (DVDs), other types of optical storage devices, or magnetic cassette. Alternatively, the programs may be stored in a memory provided by a combination of all or part of these devices. Also, each memory may include a plurality of configured memories.

Also, the programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the present disclosure. Also, a separate storage on the communication network may access the device that performs the embodiments of the present disclosure.

In specific embodiments of the present disclosure, the elements included in the present disclosure have been expressed in the singular or plural form according to the suggested specific embodiments of the present disclosure. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

Although specific embodiments have been described in the detailed description of the present disclosure, various modifications may be made without departing from the scope of the present disclosure. Therefore, the scope of the present disclosure should not be limited to the above-described embodiments of the present disclosure and should be determined by the appended claims and the equivalents thereof.

The invention claimed is:

1. A method performed by a terminal with a dual reception/transmission (RX/TX) chain in a wireless communication system, the method comprising:
transmitting, to a source base station, information for supporting a first type handover, HO, where the terminal maintains a data transmission and reception with the source base station until a time point after establishing a connection with a target base station;
receiving, from the source base station, a radio resource control (RRC) reconfiguration message including information for the first type handover;
in response to receiving the RRC reconfiguration message, starting a timer associated with the first type handover and transmitting a preamble to the target base station; and
maintaining the data transmission and reception with the source base station until a release related message transmission of the target base station is performed,
wherein, when the first type handover to the target base station is not successfully completed until the timer expires, the first type handover to the target base station fails,
when the first type handover to the target base station fails and a data transmission and reception between the terminal and the source base station is available, identifying that a radio link failure (RLF) is not detected; and
when the first type handover to the target base station fails and the data transmission and reception between the terminal and the source base station is not available, identifying that RLF is detected.

2. The method of claim 1, further comprising:
when identifying that the RLF is not detected, transmitting, to the source base station, an indicator indicating a failure of the first type handover to the target base station.

3. The method of claim 2, wherein when identifying that the RLF is not detected, a data transmission and reception between the terminal and the source base station is maintained.

4. The method of claim 1, further comprising,
in case of identifying that the RLF is detected, performing a RRC connection re-establishment procedure for a cell selection.

5. A terminal with a dual reception/transmission (RX/TX) chain in a wireless communication system, the terminal comprising:
a transceiver; and
at least one processor configured to:
transmit, to a source base station via the transceiver, information for supporting a first type handover, HO, where the terminal maintains a data transmission and reception with the source base station until a time point after establishing a connection with a target base station,
receive, from the source base station via the transceiver, a radio resource control (RRC) reconfiguration message including information for a firth type handover,
in response to receiving the RRC reconfiguration message, start a timer associated with the first type handover and transmit a preamble to the target base station via the transceiver, and maintain the data transmission and reception with the source base station until a release related message transmission of the target base station is performed, wherein, when the first type handover to the target base station is not successfully completed until the timer expires, the first type handover to the target base station fails, when the first type handover to the target base station fails and a data transmission and reception between the terminal and the source base station is available, identify that a radio link failure (RLF) is not detected, and when the first type handover to the target base station fails and the data transmission and reception between the terminal and the source base station is not available, identify that RLF is detected.

6. The terminal of claim 5, wherein the at least one processor is further configured to, when identifying that the RLF is not detected, transmit, to the source base station via the transceiver, an indicator indicating a failure of the first type handover to the target base station.

7. The terminal of claim 6, wherein, when identifying that the RLF is not detected, a data transmission and reception between the terminal and the source base station is maintained.

8. The terminal of claim 5, wherein, the at least one processor is further configured to, when the RLF is detected, perform a RRC connection re-establishment procedure for a cell selection.

* * * * *